US009544644B2

(12) United States Patent
Isozaki et al.

(10) Patent No.: US 9,544,644 B2
(45) Date of Patent: Jan. 10, 2017

(54) BROADCAST RECEIVING DEVICE AND INFORMATION PROCESSING SYSTEM

(71) Applicant: Kabushiki Kaisha Toshiba, Minato-ku (JP)

(72) Inventors: Hiroshi Isozaki, Kawasaki (JP); Jun Kanai, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/484,626

(22) Filed: Sep. 12, 2014

(65) Prior Publication Data

US 2015/0100978 A1 Apr. 9, 2015

(30) Foreign Application Priority Data

Oct. 3, 2013 (JP) ................................. 2013-208416

(51) Int. Cl.
*H04L 29/06* (2006.01)
*H04N 21/4408* (2011.01)
(Continued)

(52) U.S. Cl.
CPC ...... *H04N 21/4408* (2013.01); *H04N 21/2381* (2013.01); *H04N 21/26613* (2013.01);
(Continued)

(58) Field of Classification Search
CPC ..................... H04N 21/4408; H04N 21/44008; H04N 21/63345; H04N 21/643; H04N 21/4383; H04N 21/835; H04N 21/64322; H04N 21/26613; H04N 21/2381
(Continued)

(56) References Cited

U.S. PATENT DOCUMENTS 6,038,319 A * 3/2000 Chari .................. H04N 7/163
348/E5.006
2002/0126780 A1 9/2002 Oshima et al.
(Continued)

FOREIGN PATENT DOCUMENTS

| JP | 2002-271281 A | 9/2002 |
|----|---------------|--------|
| JP | 2007-310872 A | 11/2007 |
| JP | 2014-38245 A | 2/2014 |
| JP | 2014-38521 A | 2/2014 |

OTHER PUBLICATIONS

RFC 5849—"The OAuth 1.0 Protocol", Internet Engineering Task Force (IETF), E. Hammer-Lahav, Ed., Informational, http://tools.ietf.org/html/rfc5849, (Apr. 2010), 38 pages.

*Primary Examiner* — Mohammad W Reza
(74) *Attorney, Agent, or Firm* — Oblon, McClelland, Maier & Neustadt, L.L.P.

(57) ABSTRACT

According to an embodiment, a broadcast receiving device includes a tuner, an acquirer, a signature executor, a first interface, a command receiver, and a transmitter. The tuner is configured to receive broadcast waves containing information identifying a broadcast program, a broadcast program, and a viewing certificate certifying that a specific broadcast program has been received. The acquirer is configured to acquire the viewing certificate from the broadcast waves received by the tuner. The signature executor is configured to sign the acquired viewing certificate by using a key. The first interface is connected to an external device via a network. The command receiver is configured to receive a command for acquiring the viewing certificate from the external device. The transmitter is configured to transmit the viewing certificate to which the signature is applied to the external device that has issued the acquisition command.

15 Claims, 27 Drawing Sheets

(51) Int. Cl.
  *H04N 21/835* (2011.01)
  *H04N 21/266* (2011.01)
  *H04N 21/6334* (2011.01)
  *H04N 21/2381* (2011.01)
  *H04N 21/643* (2011.01)
  *H04N 21/438* (2011.01)
  *H04N 21/44* (2011.01)

(52) U.S. Cl.
  CPC ... *H04N 21/4383* (2013.01); *H04N 21/44008* (2013.01); *H04N 21/63345* (2013.01); *H04N 21/643* (2013.01); *H04N 21/64322* (2013.01); *H04N 21/835* (2013.01)

(58) Field of Classification Search
  USPC ........................................................ 713/156
  See application file for complete search history.

(56) References Cited

U.S. PATENT DOCUMENTS

| | | | |
|---|---|---|---|
| 2007/0086589 A1* | 4/2007 | Park | H04N 7/163 380/201 |
| 2007/0109262 A1 | 5/2007 | Oshima et al. | |
| 2007/0234422 A1* | 10/2007 | Piesing | H04N 21/2541 726/19 |
| 2008/0126801 A1* | 5/2008 | Lee | H04L 9/006 713/167 |
| 2010/0272267 A1* | 10/2010 | Conus | H04N 7/165 380/281 |
| 2014/0052986 A1 | 2/2014 | Kanai et al. | |
| 2014/0052993 A1 | 2/2014 | Isozaki et al. | |

* cited by examiner

SCREEN (GUI) ON WHICH WEB APP APPEARS

BROADCAST PROGRAM RECEIVED FROM BROADCAST WAVES AND DECODED

FIG.26

| WEB APPLICATION UNIQUE ID |
| --- |
| WEB APPLICATION SOURCE (DOMAIN NAME) |
| SIGNATURE |
| SIGNATURE SCHEME (OPTIONAL) |

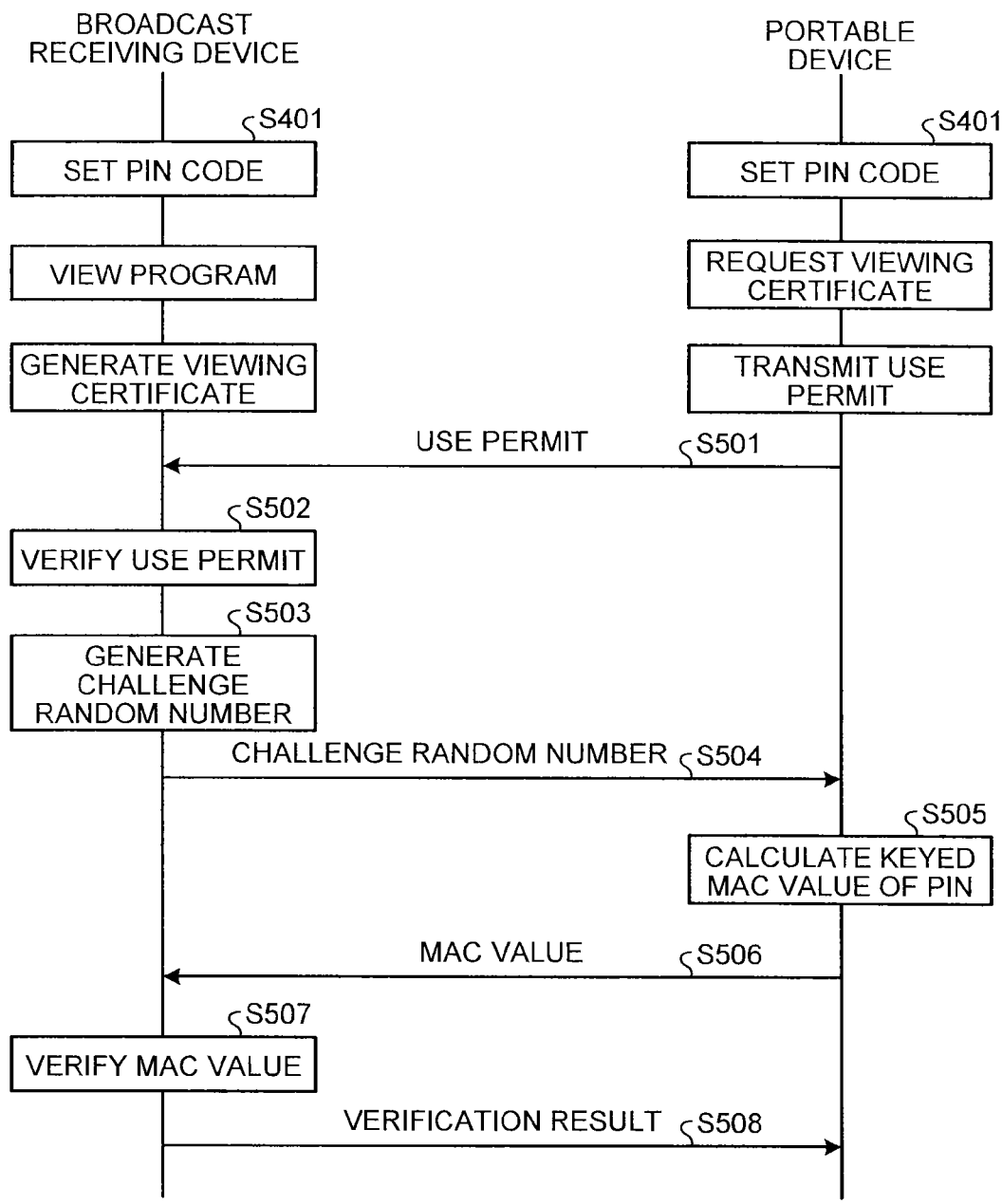

BROADCAST RECEIVING DEVICE AND INFORMATION PROCESSING SYSTEM

CROSS-REFERENCE TO RELATED APPLICATION(S)

This application is based upon and claims the benefit of priority from Japanese Patent Application No. 2013-208416, filed on Oct. 3, 2013; the entire contents of which are incorporated herein by reference.

FIELD

Embodiments described herein relate generally to a broadcast receiving device and an information processing system.

BACKGROUND

In recent years, such technologies as connecting a portable device such as a smart phone and a tablet with a digital television set via a network, operating the digital television set through the portable device, and receiving information from the digital television are started to be used.

Furthermore, there have been demands for publishing a certificate showing that a specific broadcast program has been viewed to a user who has viewed the program on digital television, and execution of various processes between other devices and the portable device on the basis of such a certificate. If a certificate is altered or acquired in an unauthorized manner, however, unauthorized manipulation through a portable device may be made possible.

BRIEF DESCRIPTION OF THE DRAWINGS

FIG. 26 is a diagram illustrating an example of a format of a use permit according to the third embodiment;

FIG. 30 is a flowchart illustrating procedures between a broadcast receiving device and a portable device according to a modified example of the third embodiment.

DETAILED DESCRIPTION

According to an embodiment, a broadcast receiving device includes a tuner, an acquirer, a signature executor, a first interface, a command receiver, and a transmitter. The tuner is configured to receive broadcast waves containing information identifying a broadcast program, a broadcast program, and a viewing certificate certifying that a specific broadcast program has been received. The acquirer is configured to acquire the viewing certificate from the broadcast waves received by the tuner. The signature executor is configured to sign the acquired viewing certificate by using a key. The first interface is connected to an external device via a network. The command receiver is configured to receive a command for acquiring the viewing certificate from the external device. The transmitter is configured to transmit the viewing certificate to which the signature is applied to the external device that has issued the acquisition command.

First Embodiment

Figure 1:
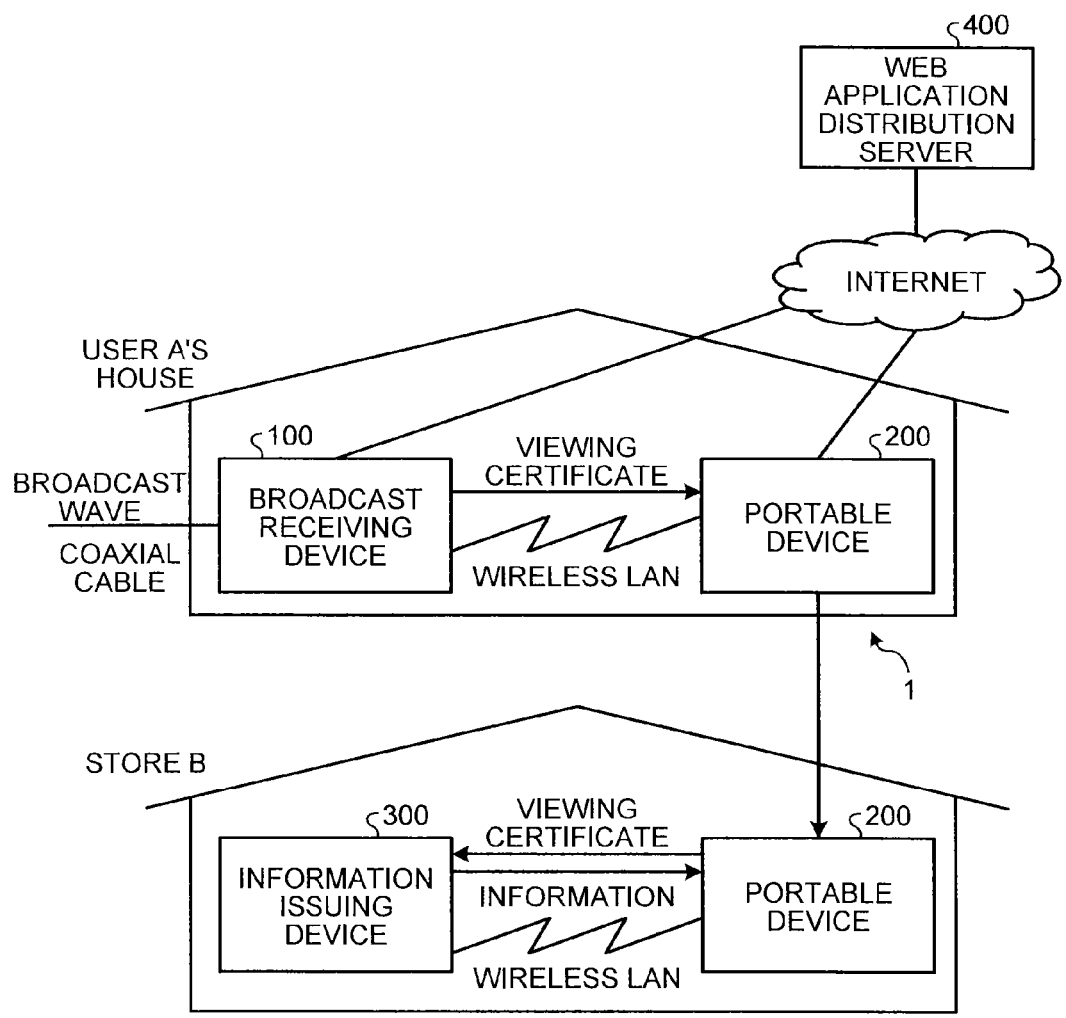
FIG. 1 is a block diagram illustrating an information processing system according to a first embodiment.

FIG. 1 is a diagram illustrating a schematic configuration of an information processing system 1 including a broadcast receiving device 100, and a portable device 200 and an information issuing device 300 that are external devices according to the first embodiment. The information processing system 1 of FIG. 1 includes the broadcast receiving device 100, the portable device 200, the information issuing device 300, and a web application distribution server 400. The broadcast receiving device 100 outputs AV data and text information contained in broadcast waves as video. The portable device 200 receives a viewing certificate transmitted from the broadcast receiving device 100. The web application distribution server 400 distributes web applications (hereinafter also referred to as web apps) to the broadcast receiving device 100 and the portable device 200. The information issuing device 300 transmits information to the portable device 200 in response to a viewing certificate transmitted from the portable device 200.

A viewing certificate is information certifying that the broadcast receiving device 100 has received a specific broadcast program transmitted by broadcast waves. A viewing certificate contains information indicating what broadcast program has been viewed on the broadcast receiving device 100 and has a signature signed with a secret key assigned to each broadcast receiving device 100 to prevent alteration.

A web application refers to an application to be executed in a runtime environment of a web browser that can interpret the HTML (Hyper Text Markup Language), JavaScript (registered trademark), or the like. The version of the HTML may be 4 or 5. A web application typically includes multiple page files and media files. A media file refers to a file in which audiovisual data such as MPEG format, JPEG, GIF, or the like are stored, or a file in which audio data in the MP3 format or the like are stored. In contrast, a page file may store control program information such as JavaScript in addition to arrangement information of texts and images represented as HTML or the like, character data, and the like. Furthermore, HTML5 or JavaScript can communicate with an HTTP server and a WebSocket server using a protocol called HTTP (XMLHTTPRequest) or WebSocket.

The broadcast receiving device 100 receives broadcast waves. Although the example illustrated in FIG. 1 is an example in which broadcast waves are received through a coaxial cable, broadcast waves may alternatively be received from a broadcast distribution server, which is not illustrated, connected using an Internet protocol instead of the coaxial cable.

The broadcast receiving device 100 and the portable device 200 are connected through a wired or wireless network, and the portable device 200 transmits to the broadcast receiving device 100 a command instructing to transmit a viewing certificate. In response thereto, the broadcast receiving device 100 transmits a viewing certificate to the portable device 200. The portable device 200 stores the received viewing certificate in a storage area therein.

The portable device 200 is connected to the web application distribution server 400 via the Internet, and configured to receive a web application. The broadcast receiving device 100 is also connected to the web application distribution server 400 via the Internet, and configured to receive a web application.

Various communication formats such as infrared rays, a wireless LAN based on the IEEE802.11 standard, and the Ethernet (registered trademark) can be adopted as a physical layer and a link layer for transmitting a viewing certificate from the broadcast receiving device 100 to the portable device 200, and a wireless LAN is illustrated as an example in FIG. 1.

Note that these interfaces may be wired or wireless. When an Internet protocol (IP) is used as a network layer, the protocol may be IPv4 or IPv6. When an interface is an IP, a wireless access point or a router, which is not illustrated, may be connected between the broadcast receiving device 100 and the portable device 200. Although an example in which a viewing certificate is transmitted from the broadcast receiving device 100 to the portable device 200 via the wireless LAN is described herein, any form of the network may be used. Details of the viewing certificate will be described later.

The broadcast receiving device 100 includes an HTTP processor 103 (key receiver) that is an IP interface for communication with the web application distribution server 400 in addition to the connection for communication with the portable device 200. Similarly, the portable device 200 also includes an IP interface for communication with the web application distribution server 400 in addition to the connection for communication with the broadcast receiving device 100. These IP interfaces are included in an HTTP processor 203, which will be described later.

Various communication formats such as a wireless LAN based on the IEEE802.11 standard and the Ethernet can be adopted as physical layers and link layers of the IP interfaces. When an Internet protocol (IP) is used as a network layer, the protocol may be IPv4 or IPv6.

Furthermore, the broadcast receiving device 100 and the web application distribution server 400 are connected using an Internet protocol (IP) via the Internet, for example. Similarly, the portable device 200 and the web application distribution server 400 are connected using an IP via the Internet, for example.

The broadcast receiving device 100 and the portable device 200 download web applications from the web application distribution server 400 and execute the downloaded web applications. The broadcast receiving device 100 and the portable device 200 may download different web applications from multiple web application distribution servers 400 and execute the downloaded web applications.

The portable device 200 is a device that can be carried by a user, and can be moved to an area in which the portable device 200 can communicate with the information issuing device 300 connected to a network different from that to which the broadcast receiving device 100 is connected. Specifically, the portable device 200 once disconnects communication with the broadcast receiving device 100 such as a TV set installed in a house, for example, and is moved to a place such as a store, where the portable device is then connected to the information issuing device 300 via a wired or wireless network.

The portable device 200 transmits the viewing certificate that is received from the broadcast receiving device 100 and stored therein to the information issuing device 300. The information issuing device 300 returns information to the portable device 200 in response thereto. An example of the information returned to the portable device 200 by the information issuing device 300 may be a coupon issued to a person who has viewed a specific broadcast program.

Various communication formats such as infrared rays, a wireless LAN based on the IEEE802.11 standard, and the Ethernet (registered trademark) can be adopted as physical layers and link layers for transmitting a viewing certificate from the portable device 200 to the information issuing device 300 and transmitting information from the information issuing device 300, and a wireless LAN is illustrated as an example in FIG. 1.

Note that these interfaces may be wired or wireless. When an Internet protocol (IP) is used as a network layer, the protocol may be IPv4 or IPv6. When an interface is an IP, a wireless access point or a router, which is not illustrated, may be connected between the information issuing device 300 and the portable device 200. Although an example in which a viewing certificate is transmitted from the portable device 200 to the information issuing device 300 via the wireless LAN is described herein, any form of the network may be used.

Furthermore, although an arrangement in which the broadcast receiving device 100 and the information issuing device 300 are located at different places and connected to different networks is illustrated in FIG. 1, the broadcast receiving device 100 and the information issuing device 300 may alternatively be connected to the same network and may be located at the same place. In the following example, a case in which the broadcast receiving device 100 and the information issuing device 300 are located at different places and connected to different networks will be described.

Figure 2:
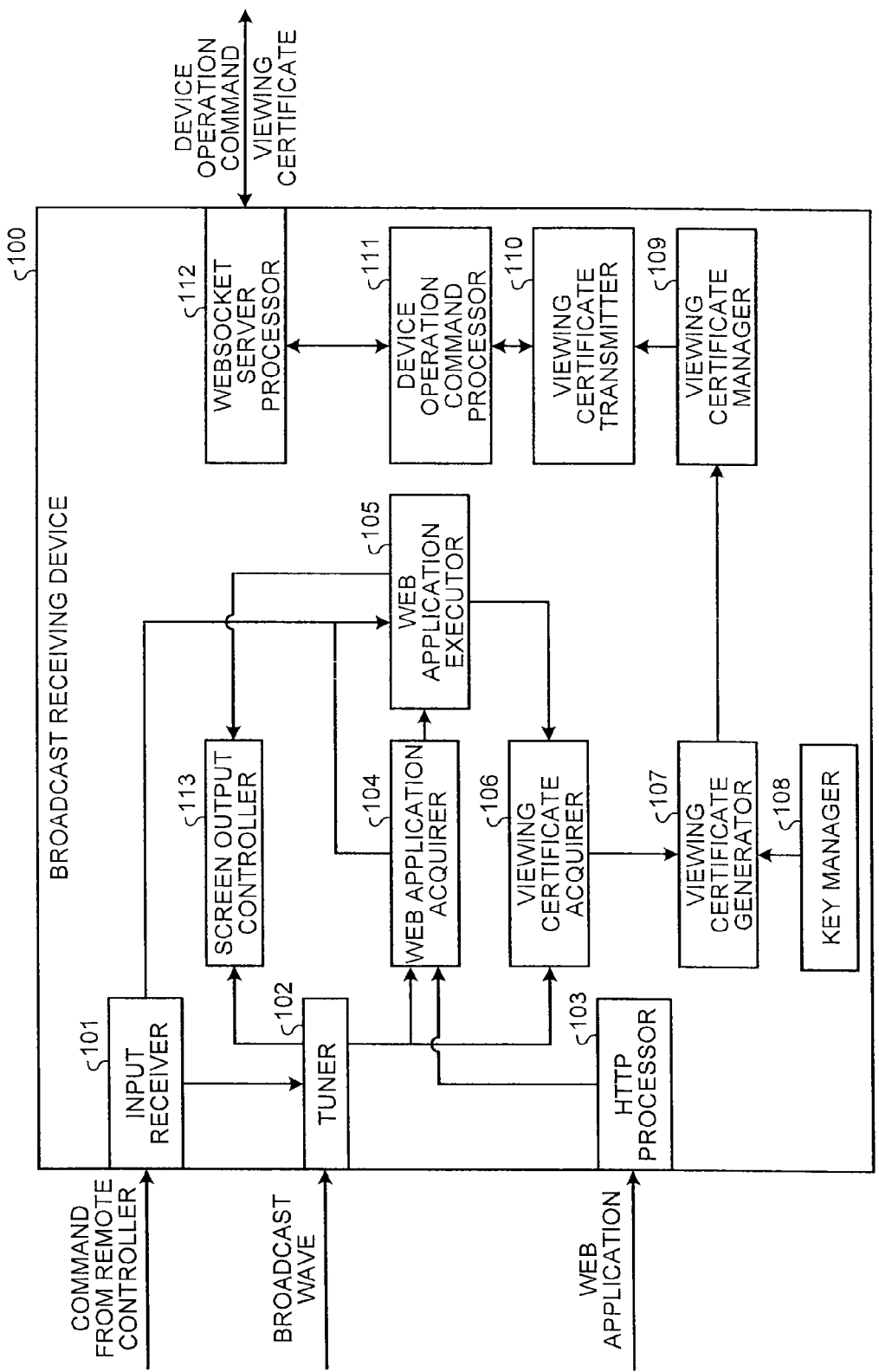
FIG. 2 is a block diagram illustrating an internal configuration of a broadcast receiving device according to the first embodiment.

FIG. 2 is a block diagram illustrating an internal configuration of the broadcast receiving device 100 according to the first embodiment. The broadcast receiving device 100 of FIG. 2 includes an input receiver 101, a tuner 102, a screen output controller 113, the HTTP processor 103, a web application acquirer 104, a web application executor 105, a viewing certificate acquirer 106 (an acquirer), a viewing certificate generator 107 (a signature executor), a key manager 108, a viewing certificate manager 109, a WebSocket server processor 112, a device operation command processor 111, and a viewing certificate transmitter 110.

The input receiver 101 is a processing unit including a communication interface such as infrared rays or Bluetooth (registered trademark), and configured to receive a command such as channel selection and volume adjustment input through the communication interface and operate the tuner 102.

The tuner 102 performs processing to receive broadcast waves. The broadcast waves have a specific broadcast program, and broadcast related information containing information specifying the program and a viewing certificate. The screen output controller 113 decodes video data and audio data output from the tuner 102, and outputs the decoding result to an internal liquid crystal monitor or an external output interface, which is not illustrated. The external output interface refers to an interface such as an HDMI (High-Definition Multimedia Interface), a composite interface, an S-Video interface, or a component interface.

The HTTP processor 103 communicates with the web application distribution server 400 using a protocol such as the HTTP (Hypertext Transfer Protocol) or the HTTPS (Hypertext Transfer Protocol over Secure Socket Layer), and performs HTTP client processing, TCP/IP processing, and link layer processing/physical layer processing required for a web application, which will be described later.

The web application acquirer 104 uses the HTTP processor 103 to perform processing for acquiring a web application, which will be described later, from a predetermined web server (web application distribution server 400). The web application executor 105 performs web browser processing for executing the web application acquired by the web application acquirer 104. The viewing certificate acquirer 106 performs processing for acquiring an unsigned viewing certificate from the broadcast wave received by the tuner 102 on the basis of an instruction from the web application executor 105. The key manager 108 (unique key manager) is a processing unit configured to store and manage a key for signing a viewing certificate.

The viewing certificate generator 107 uses a key stored in the key manager 108 to perform signature processing on an unsigned viewing certificate acquired by the viewing certificate acquirer 106. A public key cryptography or a Message Authentication Code (MAC) using a common key may be used for the signature processing. In the following, signature using a public key cryptography will be described. For the algorithm for the public key, a well-known public key algorithm such as an RSA cryptography or an elliptic curve cryptography may be used.

The viewing certificate manager 109 is a processing unit configured to store and manage a viewing certificate that is signed by the viewing certificate generator 107. The WebSocket server processor 112 (command receiver) performs server processing for communication with the portable device 200 according to a protocol called WebSocket defined by the RFC6455 standard. The WebSocket server processor 112 performs processing for receiving data such as a viewing certificate transmission command transmitted from the portable device 200 and transmitting a viewing certificate and the like to the portable device 200. Note that TCP/IP processing and link layer processing/physical layer processing of the WebSocket server processor 112 may be shared with the HTTP processor 103 or the WebSocket server processor 112 may have the processing independently of the HTTP processor 103.

The device operation command processor 111 receives a device operation command transmitted from the portable device 200 over WebSocket, and performs processing according to the command. Examples of the device operation command include a command requesting to transmit a viewing certificate, a channel selection command and directed to the tuner 102, and a volume adjustment command.

The viewing certificate transmitter 110 is a processing unit configured to acquire a viewing certificate stored in the viewing certificate manager 109 and transmit the viewing certificate when the command from the portable device 200 is a command instructing to transmit a viewing certificate.

Figure 3:
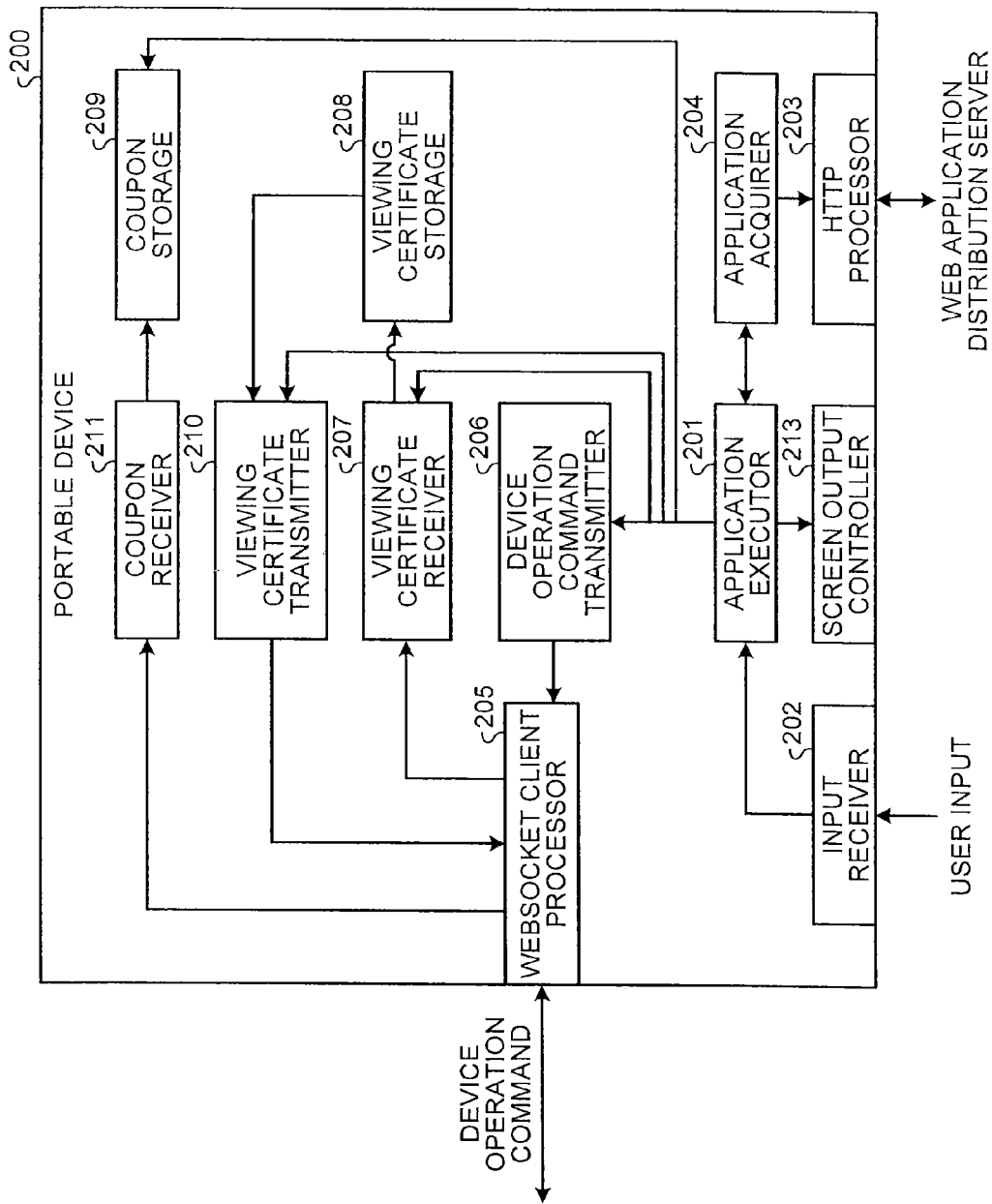
FIG. 3 is a block diagram illustrating an internal configuration of a portable device according to the first embodiment.

FIG. 3 is a block diagram illustrating an internal configuration of the portable device 200 according to the first embodiment. The portable device 200 of FIG. 3 includes the HTTP processor 203, an application acquirer 204, an application executor 201, an input receiver 202, a screen output controller 213, a WebSocket client processor 205, a device operation command transmitter 206, a viewing certificate receiver 207, a viewing certificate storage 208, a viewing certificate transmitter 210, a coupon receiver 211, and a coupon storage 209.

The HTTP processor 203 communicates with a web server (HTTP server) using a protocol such as the HTTP (Hypertext Transfer Protocol) or the HTTPS (Hypertext Transfer Protocol over Secure Socket Layer), and performs HTTP client processing, TCP/IP processing, and link layer processing/physical layer processing required for requesting and acquiring a web application, which will be described later.

In response to a request from the application acquirer 204, which will be described later, the HTTP processor 203 transmits a request for acquiring a web application, which will be described later, to a predetermined web server (web application distribution server 400), and receives a web application thus acquired. The HTTP processor 203 transmits the received web application to the application acquirer 204.

The application acquirer 204 uses the HTTP processor 203 to perform processing for acquiring a PF application and a web application, which will be described later, from a predetermined web server (web application distribution server 400) and transmitting the acquired applications to the application executor 201.

The application executor 201 performs web browser processing for executing the web application acquired by the application acquirer 204. The input receiver 202 receives information input by the user via an input device such as a touch pad, a keyboard, and a mouse, and informs the application executor 201 of the input information.

The WebSocket client processor 205 performs client processing for communication with the broadcast receiving device 100 according to a protocol called WebSocket defined by the RFC6455 standard. Data such as a device operation command to be transmitted to the WebSocket server are processed by the WebSocket client processor 205, given a header or the like and transmitted to the broadcast receiving device 100 according to a format defined by the RFC6455 standard. Note that TCP/IP processing and link layer processing/physical layer processing of the WebSocket client processor 205 may be shared with the HTTP processor 203 or the WebSocket client processor 205 may have the processing independently of the HTTP processor 203.

The screen output controller 213 displays or outputs a screen generated by the application executor 201 for display on a monitor therein or to an external output interface, which is not illustrated. The external output interface refers to an interface such as an HDMI (High-Definition Multimedia Interface), a composite interface, an S-Video interface, or a component interface.

The device operation command transmitter 206 is a processing unit configured to request the WebSocket client processor 205 to transmit a device operation command to the broadcast receiving device 100 on the basis of an instruction from the application executor 201. The viewing certificate receiver 207 is a processing unit configured to receive a viewing certificate transmitted from the broadcast receiving device 100 in response to a command requesting to transmit a viewing certificate that is a device operation command, and request the viewing certificate storage 208 to store the received viewing certificate.

The viewing certificate storage 208 is a processing unit configured to store and manage viewing certificates. The viewing certificate transmitter 210 is a processing unit configured to perform processing for transmitting a viewing certificate to the information issuing device 300 on the basis of an instruction from the application executor 201.

The coupon receiver 211 is a processing unit configured to perform processing for receiving a coupon transmitted from the information issuing device 300 and requesting the coupon storage 209 to store the coupon. The coupon storage 209 is a processing unit configured to store and manage coupons.

Figure 4:
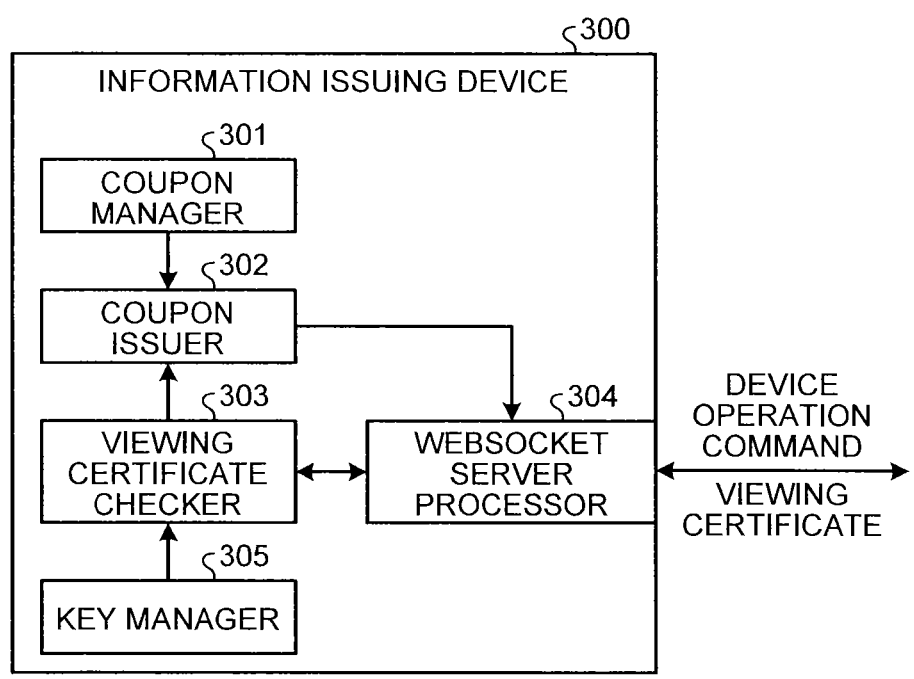
FIG. 4 is a block diagram illustrating an internal configuration of an information issuing device according to the first embodiment.

FIG. 4 is a block diagram illustrating an internal configuration of the information issuing device 300 according to the first embodiment. The information issuing device 300 of FIG. 4 includes a WebSocket server processor 304, a key manager 305, a viewing certificate checker 303, a coupon manager 301, and a coupon issuer 302.

The WebSocket server processor 304 has functions similar to those of the WebSocket server processor 112 of the broadcast receiving device 100 illustrated in FIG. 2, and performs server processing for communication with the portable device 200 according to a protocol called WebSocket defined by the RFC6455 standard. The WebSocket server processor 304 performs processing for receiving data such as a viewing certificate transmitted from the portable device 200 and transmitting coupon information and the like to the portable device 200.

The key manager 305 performs processing for storing and managing a public key for checking a signature given to a viewing certificate. The viewing certificate checker 303 performs processing for using the public key stored in the key manager 305 to check whether or not a signature given to the viewing certificate received by the WebSocket server processor 304 is validated.

The coupon manager 301 is a processing unit configured to manage information such as product discount information and new product information as a benefit for a viewer who has viewed a broadcast program or advertisement information (commercial) accompanying a broadcast program. The information is not limited to benefit information and may be any information related to a broadcast program. The information will be referred to as a coupon herein.

The coupon issuer 302 acquires a coupon associated with a viewing certificate, that is, associated with a broadcast program from the coupon manager 301 only when the viewing certificate received by the viewing certificate checker 303 is determined to be valid, and transmits the coupon to the portable device 200 via the WebSocket server processor 304.

Figure 5:
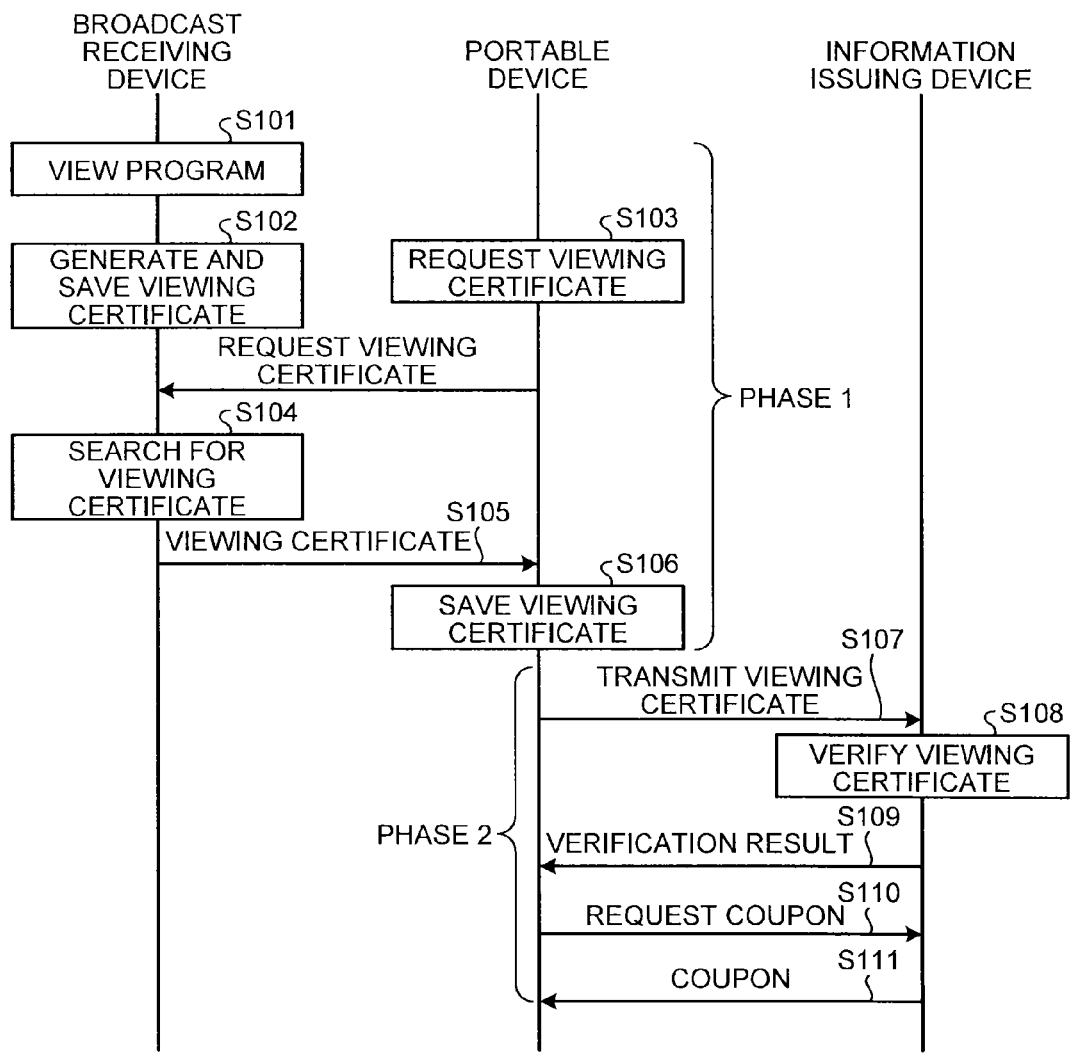
FIG. 5 is a flowchart illustrating a flow of processing performed by the information processing system according to the first embodiment.

FIG. 5 is a flowchart illustrating procedures performed by the broadcast receiving device 100, the portable device 200, and the information issuing device 300 according to the first embodiment. As illustrated in FIG. 5, the processing sequence roughly includes two phases, which are a phase 1 that is communication between the broadcast receiving device 100 and the portable device 200 and a phase 2 that is communication between the portable device 200 and the information issuing device 300. In the phase 1, the portable device 200 acquires and stores a signed viewing certificate from the broadcast receiving device 100. In the phase 2, the portable device 200 acquires and stores a coupon from the information issuing device 300. The respective phases will be described in detail below.

The phase 1 first starts when a broadcast program is viewed on the broadcast receiving device 100 (step S101). This is a process of receiving broadcast waves at the tuner 102 of the broadcast receiving device 100 and outputting a broadcast program that is currently selected to the screen output controller 113.

Figure 6:
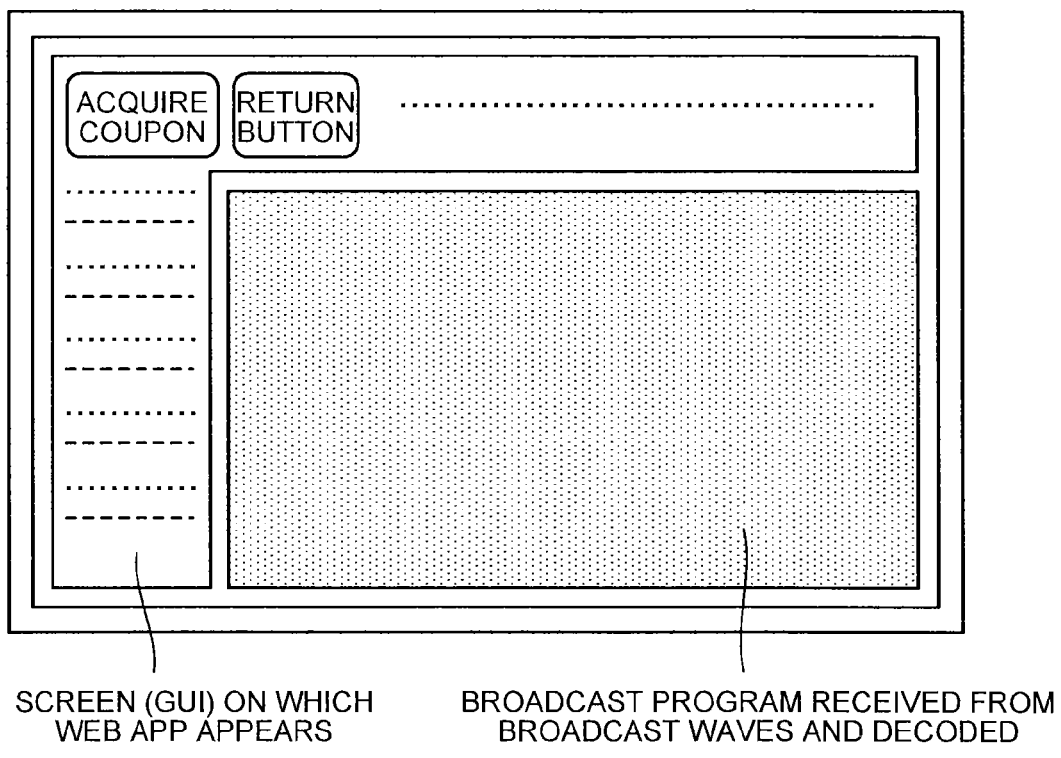
FIG. 6 is a diagram illustrating an example of a screen output by a screen output controller according to the first embodiment.

FIG. 6 illustrates an example of a screen output by the screen output controller 113 of the broadcast receiving device 100. In normal broadcast program viewing, a broadcast program received from the broadcast waves and decoded by the tuner 102 is output to the screen output controller 113. Note that the broadcast waves may contain URLs or web applications as related information in addition to broadcast programs. When such a URL or web application is contained in the broadcast waves, the tuner 102 extracts such information and transmits the information to the web application acquirer 104. If the information acquired by the tuner 102 is an URL, the web application acquirer 104 uses the HTTP processor 103 to acquire a web application based on the URL, and the web application executor 105 executes the web application.

Some web applications include GUIs (screen interfaces), and the screen illustrated in FIG. 6 is an example thereof. A resource file of the web application contains information such as positions where the broadcast program and the related information are to be displayed and the sizes thereof. The broadcast program, information such as texts and images, buttons are arranged according to such instructions. Herein, a coupon acquisition button and a return button are arranged as web applications. When the coupon acquisition button is selected, the web application executor 105 requests the viewing certificate acquirer 106 to acquire the viewing certificate contained in the broadcast waves. Note that the selection of the coupon acquisition button may be performed by instructing the application executor 201 from the input receiver 101 through an infrared remote controller or the like.

Figure 7:
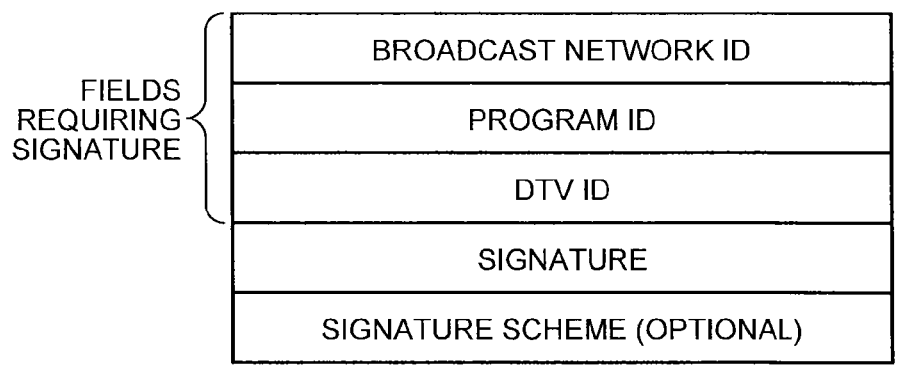
FIG. 7 is a diagram illustrating an example of a format of a viewing certificate according to the first embodiment.

Note that a viewing certificate is superimposed on a broadcast program and delivered in the form of broadcast waves. A viewing certificate contains information unique to a channel or a broadcast program. FIG. 7 illustrates an example of the format of a viewing certificate. A viewing certificate includes a broadcast network ID, a program ID, a DTV ID, a signature, and a signature scheme.

The broadcast network ID and the program ID are information for uniquely identifying a broadcast program. The broadcast network ID is an ID uniquely assigned to a broadcast station depending on a broadcast area. Thus, the broadcast network ID can uniquely identify a broadcast station in a specific area. The program ID is an ID uniquely assigned to a broadcast program of the broadcast station. The broadcast network ID and the program ID need not be in separate fields but may alternatively be in the same field. Furthermore, the program ID need not be in the form of an ID but may be a date and time when the broadcast program is broadcasted. The DTV ID is an ID uniquely assigned to the broadcast receiving device 100. A unique ID is assigned to the broadcast receiving device 100 during manufacture. The ID may have a random value or a value including an ID of the assembly manufacturer of the broadcast receiving device 100, a model ID assigned by the assembly manufacturer, and a value uniquely assigned within the model.

Note that the viewing certificate is superimposed on a broadcast content and transmitted from the broadcast waves. While proper values are inserted as the broadcast network ID and the program ID when the viewing certificate is received from the broadcast waves, no value (a value of all zero or the like that does not exist as an ID of a broadcast receiving device 100) is inserted as the DTV ID when the viewing certificate is received from the broadcast waves because the DTV ID is a field to be entered by the broadcast receiving device 100. The broadcast receiving device 100 therefore inserts an ID assigned thereto into this field.

The signature is a signature applied to the fields requiring a signature by the viewing certificate generator 107 using a key managed by the key manager 108. Similarly to the DTV ID, no value is inserted in this field when the viewing certificate is received from the broadcast waves, and the broadcast receiving device 100 fills this field. The signature scheme refers to an algorithm representing the scheme of the signature. This field is optional. No value is inserted in this field, either, when the viewing certificate is received from the broadcast waves, and the broadcast receiving device 100 fills in this field. Since the viewing certificate only needs to be transmitted to the portable device 200 with a signature added thereto, the viewing certificate need not necessarily be superimposed on the broadcast waves and transmitted from the broadcast station. For example, the viewing certificate may be received from a viewing certificate distribution server, which is not illustrated using an IP network via the Internet. The broadcast network ID is transmitted from the broadcast waves. Thus, according to the format illustrated in FIG. 7, the broadcast receiving device 100 may acquire the broadcast network ID from the broadcast waves, fills the broadcast time on which the program is broadcasted in the program field, and insert an ID assigned thereto into the DTV ID.

Although an example in which the broadcast receiving device 100 acquires and generates a viewing certificate by explicitly selecting the coupon acquisition button is presented in FIG. 6, a viewing certificate may be automatically acquired and generated without generating any GUIs by web applications. If a viewing certificate is automatically acquired, the broadcast receiving device 100 may acquire and generate a viewing certificate when the program is switched, that is, when the broadcast network ID or the program ID is switched, or may periodically acquire a viewing certificate.

Subsequently, referring back to FIG. 5, when a signed viewing certificate is generated by the viewing certificate generator 107, the signed viewing certificate is stored by the viewing certificate manager 109 (step S102). Subsequently, the portable device 200 transmits to the broadcast receiving device 100 a command instructing to transmit a viewing certificate (step S103). In this process, the portable device 200 may include its ID (identification information) in the command. The command establishes a WebSocket connection between the devices by using the WebSocket client processor 205 or the WebSocket server processor 112 (receiver) and is transmitted over the connection. A request for acquiring a viewing certificate may be a request for acquiring all the viewing certificates stored by the viewing certificate manager 109 of the broadcast receiving device 100, a request specifying a specific network ID, a request specifying a specific network ID and a specific program ID, or a request specifying a specific date and time or period. In response to the request, the broadcast receiving device 100 acquires the ID of the portable device 200 and searches for a corresponding viewing certificate (step S104). The broadcast receiving device 100 then transmits a signed viewing certificate stored in the viewing certificate manager 109 and found therefrom to the portable device 200 (step S105). The portable device 200 stores the viewing certificate received from the broadcast receiving device 100 in a certificate storage (step S106). The phase 1 ends here and the phase 2 follows.

The phase 2 starts with a process of establishing a WebSocket connection between the WebSocket client processor 205 of the portable device 200 and the WebSocket server processor 304 of the information issuing device 300. When the WebSocket connection is established, the portable device 200 transmits the viewing certificated stored in the certificate storage to the information issuing device 300 (step S107). Although an example in which the viewing certificate is transmitted from the portable device 200 to the information issuing device 300 is presented, the information issuing device 300 may request the portable device 200 to transmit a specific viewing certificate before transmitting the viewing certificate. Furthermore, the information issuing device 300 may present a specific network ID, present a specific network ID and a specific program ID, or present a specific date and time or period to the portable device 200, and the portable device 200 may transmit a viewing certificate corresponding thereto to the information issuing device 300.

When the information issuing device 300 receives a viewing certificate, the viewing certificate checker 303 of the information issuing device 300 acquires a key stored in the key manager 108, verifies whether or not the signature added to the viewing certificate is valid (step S108), and transmits the verification result to the portable device 200 (step S109). If the verification result is positive, the portable device 200 transmits a request for transmitting a coupon to the information issuing device 300 (step S110). The information issuing device 300 transmits a coupon to the portable device 200 only when the verification result is positive (step S111).

Although an example in which the viewing certificate and the request for transmitting a coupon are transmitted as different commands is presented herein, the viewing certificate and the request for transmitting a coupon may be transmitted as one command and the information issuing device 300 may transmit a coupon only if verification of the viewing certificate is successful.

If the ID of the portable device 200 is contained in the viewing certificate, the information issuing device 300 may determine whether or not to transmit a coupon on the basis of the ID, or may change the coupon to be transmitted on the basis of the ID.

Although it is assumed in the above description that the broadcast receiving device 100 receives a broadcast program as a live broadcast and generates a viewing certificate for the broadcast program, a viewing certificate may be generated for a broadcast program that is a recorded program. The broadcast receiving device 100 may have a function of recording a broadcast content by using a secondary storage device, which is not illustrated, made of a hard disk drive (HDD). When a recorded program is played back, the same viewing certificate as one received during live broadcast may be generated or a viewing certificate generated for a recorded program may be distinguished from a viewing certificate generated for a live broadcast content.

Figure 8:
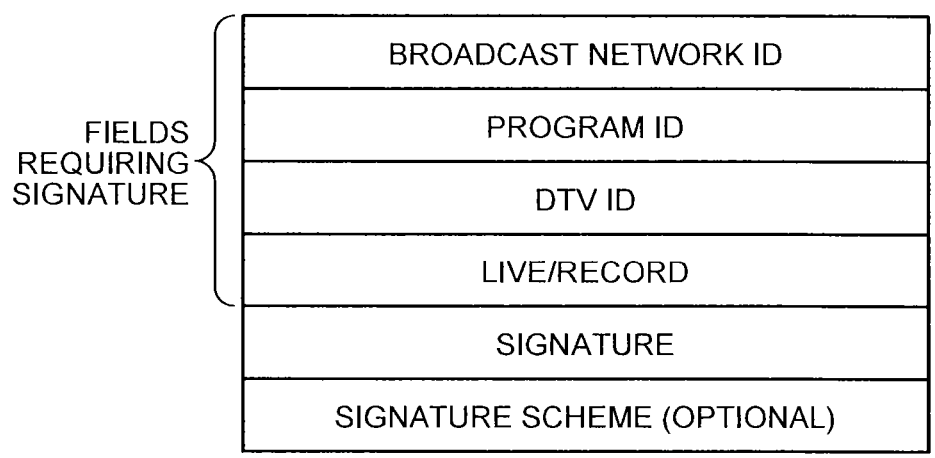
FIG. 8 is a diagram illustrating an example of a format of a viewing certificate according to the first embodiment.
Figure 9:
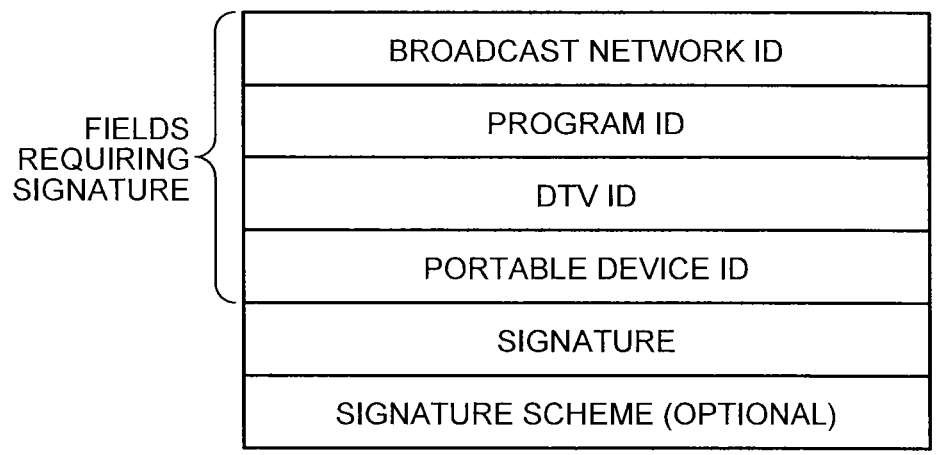
FIG. 9 is a diagram illustrating an example of a format of a viewing certificate according to the first embodiment.

FIG. 8 illustrates an example of the format of a viewing certificate when a live program and a recorded program are distinguished from each other. As illustrated in FIG. 8, a field for identifying whether the viewing certificate is generated as a result of viewing a live broadcast content or viewing a recorded broadcast content is present in the fields requiring a signature. The viewing certificate may also contain the ID of the portable device 200. FIG. 9 illustrates an example of the format of the viewing certificate in such as case.

Figure 10:
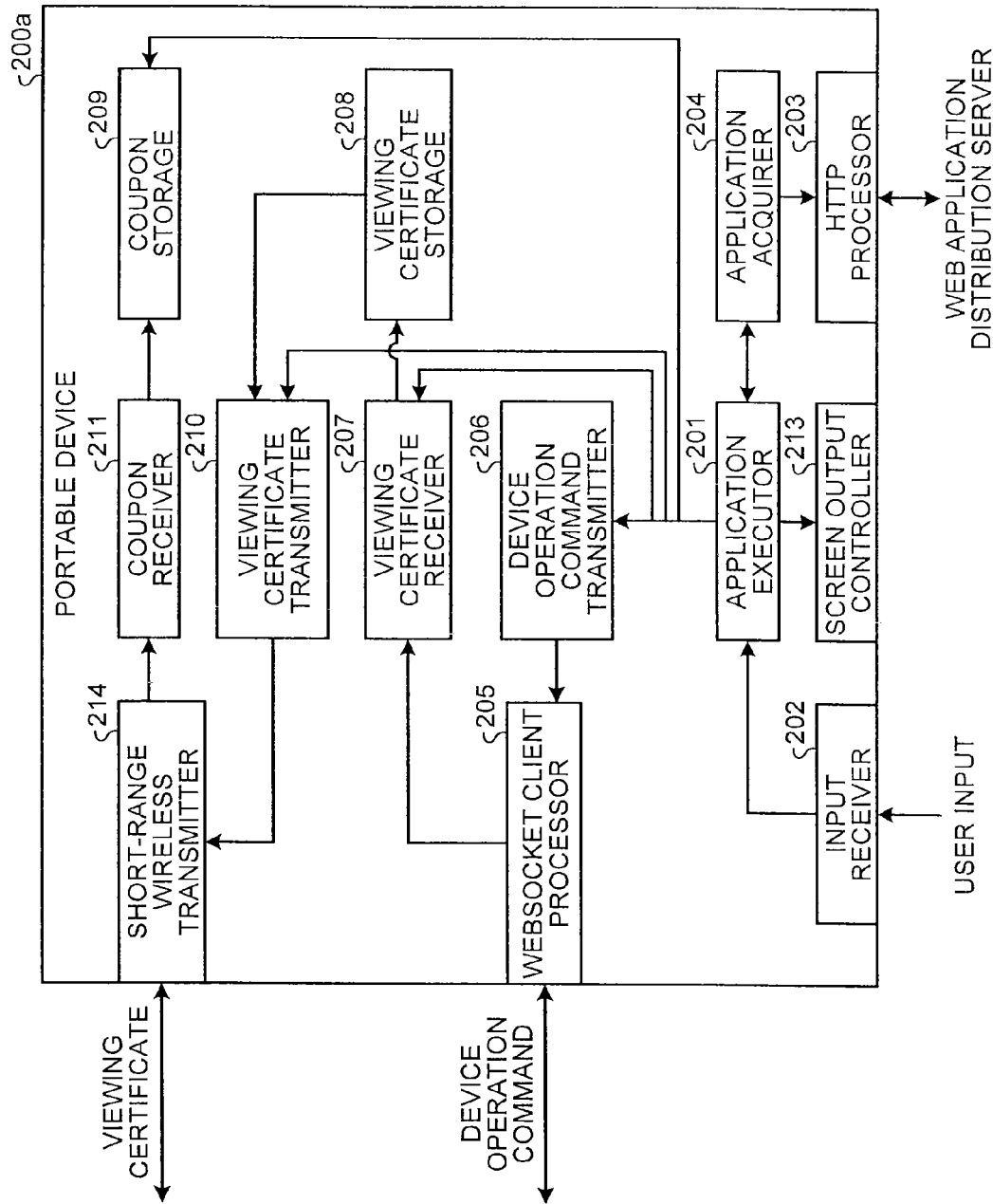
FIG. 10 is a block diagram illustrating an internal configuration of a portable device according to a modified example of the first embodiment.

FIG. 10 illustrates a modified example of the portable device 200. The difference from the portable device 200 illustrated in FIG. 3 lies in that a short-range wireless transmitter 214 is additionally provided. The portable device 200 of FIG. 3 uses the WebSocket connection by the WebSocket client processor 205 for transmission of the viewing certificate and reception of a coupon. The portable device 200a illustrated in FIG. 10 transmits a viewing certificate and receives a coupon through short-range wireless communication. For the physical layer of the short-range wireless communication, short-range wireless communication standardized as NFC or Transferjet may be used.

Figure 11:
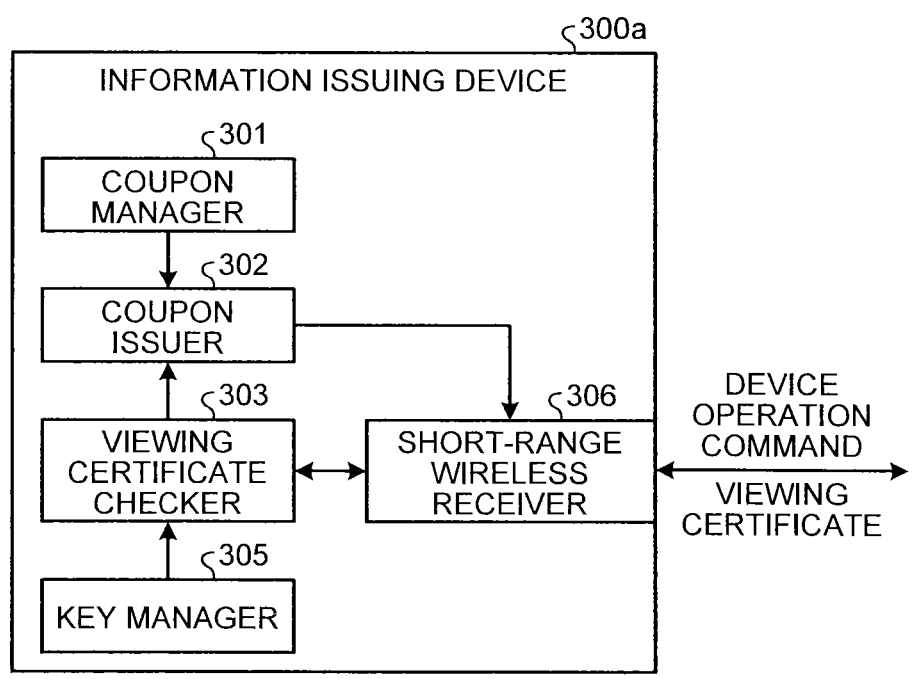
FIG. 11 is a block diagram illustrating an internal configuration of an information issuing device according to a modified example of the first embodiment.

FIG. 11 illustrates another example of the information issuing device 300. The difference from the information issuing device 300 illustrated in FIG. 4 lies in that a short-range wireless receiver 306 is provided instead of the WebSocket server processor 304. The information issuing device 300 of FIG. 4 uses the WebSocket connection by the WebSocket server processor 304 for reception of a viewing certificate and transmission of a coupon. The information issuing device 300a illustrated in FIG. 11 receives a viewing certificate and transmits a coupon through short-range wireless communication.

Figure 12:
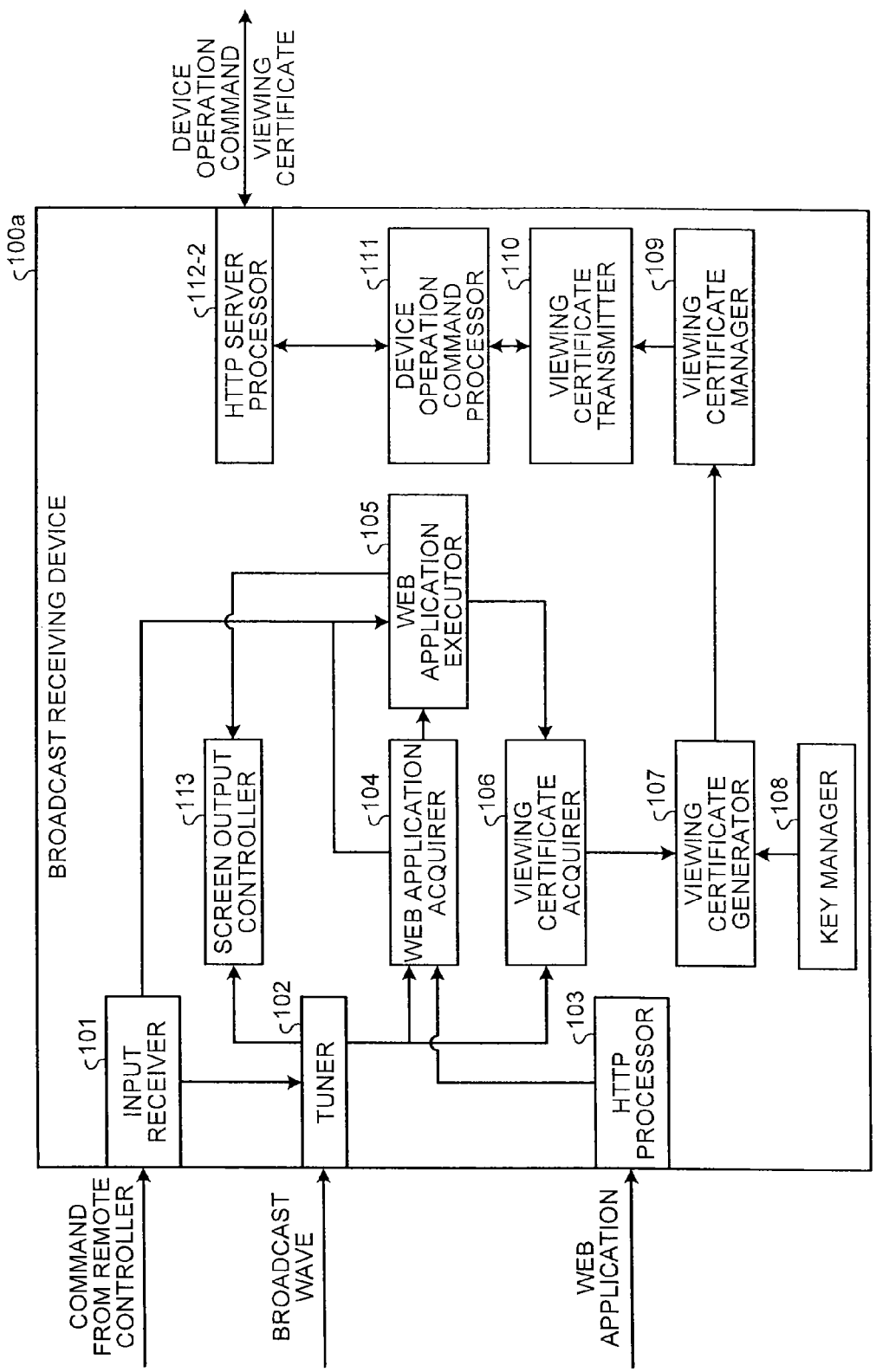
FIG. 12 is a block diagram illustrating an internal configuration of a broadcast receiving device according to a modified example of the first embodiment.

FIG. 12 illustrates another example of the broadcast receiving device 100. The difference between a broadcast receiving device 100a illustrated in FIG. 12 and the broadcast receiving device 100 illustrated in FIG. 2 lies in that an HTTP server processor 112-2 is provided instead of the WebSocket server processor 112. The HTTP server processor 112-2 performs server processing for communication using the HTTP or HTTPS protocol. Thus, in this modified example, the HTTP server processor 112-2 corresponds to the receiver. Note that TCP/IP processing and link layer processing/physical layer processing of the HTTP server processor 112-2 may be shared with the HTTP processor 103 or the HTTP server processor 112-2 may have the processing independently of the HTTP processor 103.

Figure 13:
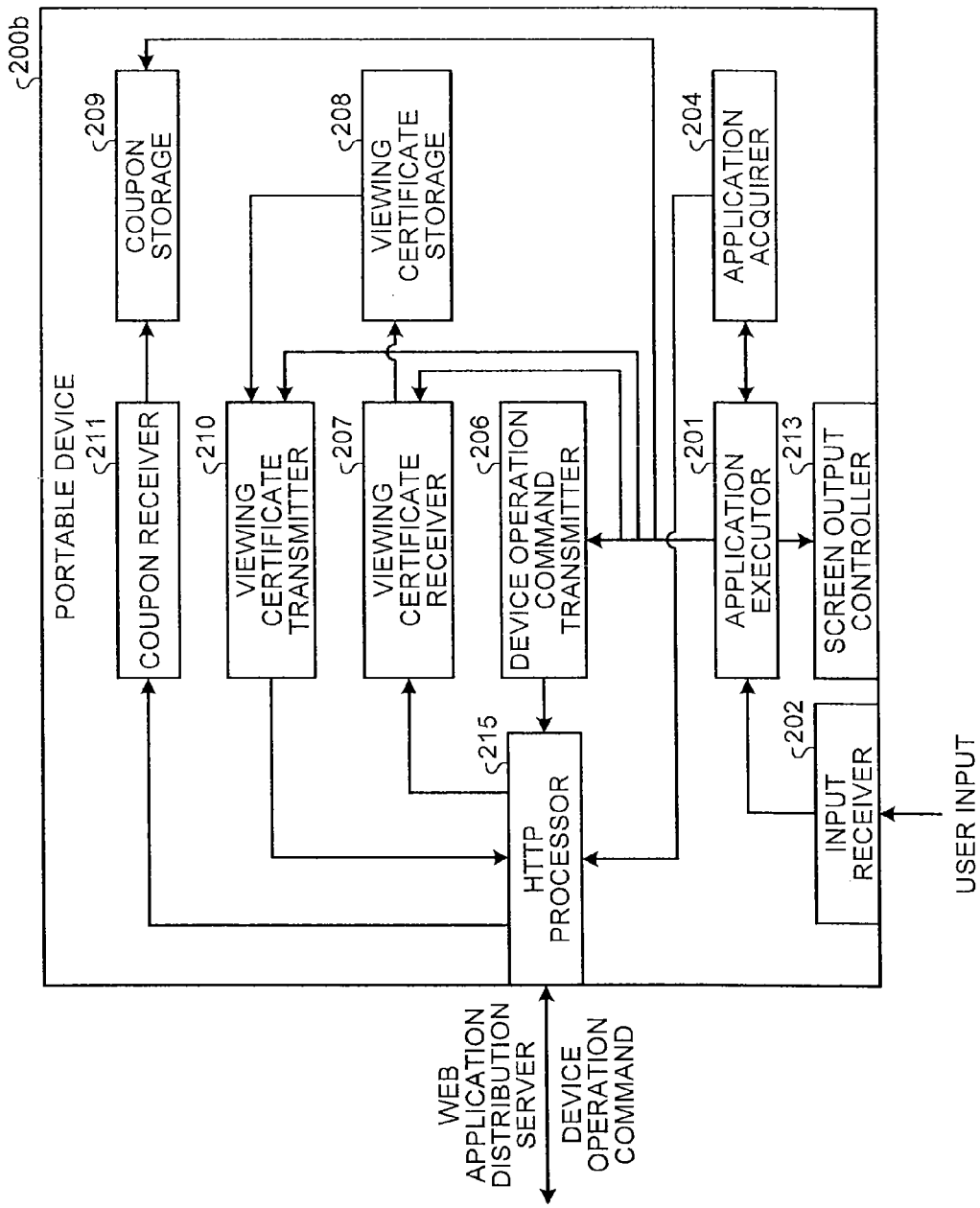
FIG. 13 is a block diagram illustrating an internal configuration of a portable device according to a modified example of the first embodiment.
Figure 14:
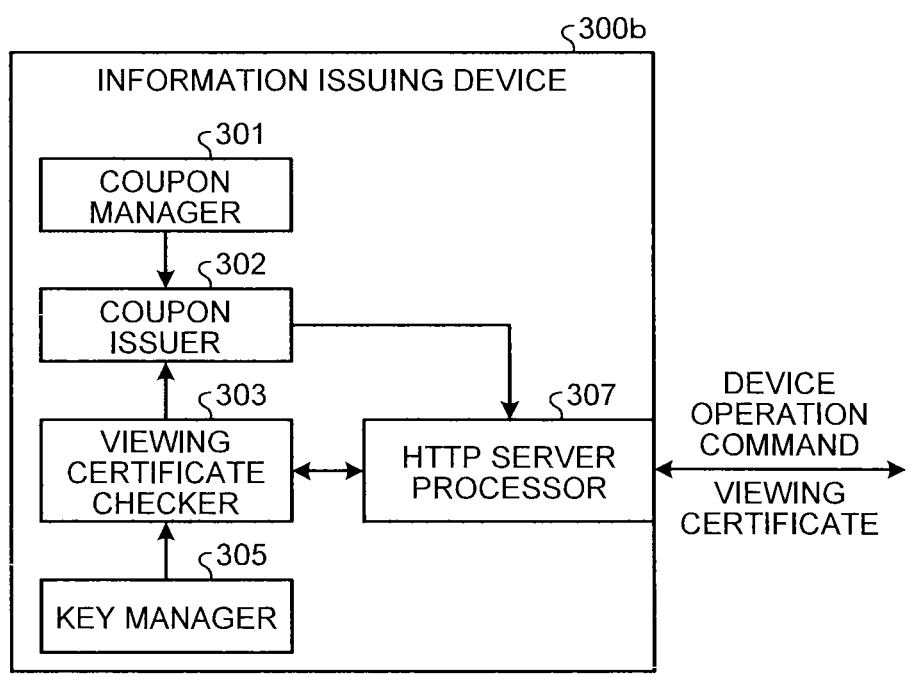
FIG. 14 is a block diagram illustrating an internal configuration of an information issuing device according to a modified example of the first embodiment.

FIG. 13 illustrates another example of the portable device 200. The difference between a portable device 200b illustrated in FIG. 13 and the portable device 200 illustrated in FIG. 3 lies in that an HTTP processor 215 is provided instead of the WebSocket client processor 205. The HTTP processor 215 may have the same configuration as the HTTP processor 103 of the broadcast receiving device 100 illustrated in FIG. 2. FIG. 14 illustrates another example of the information issuing device 300. The difference between an information issuing device 300b and the information issuing device 300 illustrated in FIG. 4 lies in that an HTTP server processor 307 is provided instead of the WebSocket server processor 304.

With the configurations illustrated in FIGS. 2 to 4, the WebSocket protocol is used for communication between the broadcast receiving device 100 and the portable device 200 and communication between the portable device 200 and the information issuing device 300. With the configurations illustrated in FIGS. 13 and 14, the HTTP protocol is used for communication instead of the WebSocket protocol. The other features are the same as those in the configurations illustrated in FIGS. 2 to 4. With the configurations of the present embodiment described above, the fact that a specific broadcast program has been viewed on the broadcast receiving device 100 can be verified by the information issuing device 300b. Furthermore, as a result of using a viewing certificate that is unalterable information and carrying the viewing certificate via the portable device 200, the aforementioned object can be achieved even when the broadcast receiving device 100 and the information issuing device 300b are located at different places. Thus, when a user has duly viewed a certain program, the information issuing device 300b can check whether the program has been viewed and issue a coupon or the like.

Second Embodiment

In the first embodiment, the broadcast receiving device 100 holds in advance the key that the broadcast receiving device 100 uses for signing a viewing certificate and the ID unique to the broadcast receiving device 100 to be embedded in the viewing certificate. In the second embodiment, a broadcast receiving device management server 500 is additionally provided, and a key that a broadcast receiving device 100c uses for signing a viewing certificate is delivered from the broadcast receiving device management server 500 to the broadcast receiving device 100c.

Figure 15:
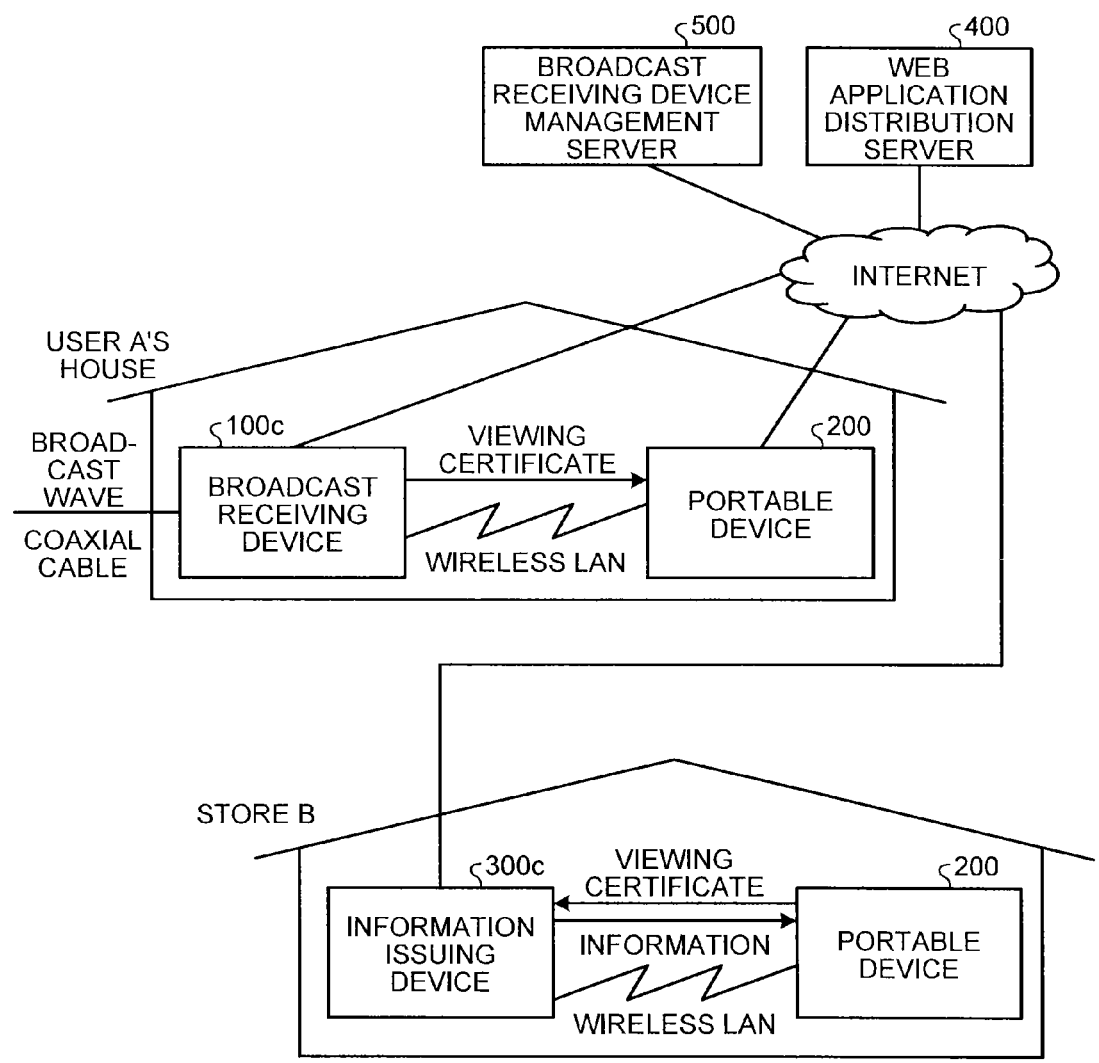
FIG. 15 is a block diagram illustrating an information processing system according to a second embodiment.

FIG. 15 is a diagram illustrating a schematic configuration of an information processing system including a broadcast receiving device 100c, and a portable device 200, and an information issuing device 300c according to the second embodiment. The differences from the information processing system of FIG. 1 lie in that the broadcast receiving device management server 500 is provided and that the broadcast receiving device 100c and the information issuing device 300c are connected with the broadcast receiving device management server 500 via the Internet.

The broadcast receiving device management server 500 has functions of managing IDs of devices to which a key (key for signature; secret key) for signing a viewing certificate and a key (key for verification; public key) for verifying a viewing certificate are delivered, and delivering the key for signature and the key for verification to the broadcast receiving device 100c and the information issuing device 300c, respectively.

Figure 16:
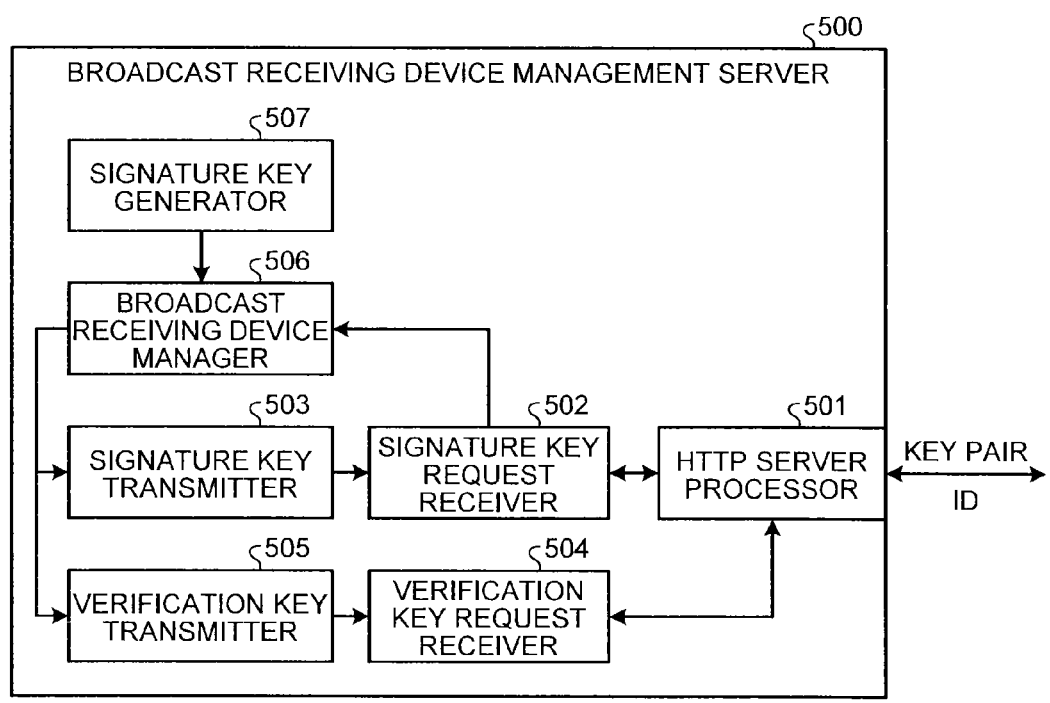
FIG. 16 is a block diagram of a broadcast receiving device management server according to the second embodiment.

FIG. 16 is a block diagram illustrating an internal configuration of the broadcast receiving device management server 500 according to the second embodiment. The broadcast receiving device management server 500 of FIG. 16 includes an HTTP server processor 501, a signature key request receiver 502, a signature key transmitter 503, a verification key request receiver 504, a verification key transmitter 505, a broadcast receiving device manager 506, and a signature key generator 507.

The HTTP server processor 501 performs server processing for communication using the HTTP or HTTPS protocol. The signature key generator 507 performs processing for generating a key (signature key) to be used for signature of a viewing certificate and a key (verification key) for verifying a viewing certificate. The signature key transmitter 503 performs processing for transmitting the signature key generated by the signature key generator 507 to the broadcast receiving device 100c. The verification key transmitter 505 performs processing for transmitting the verification key generated by the signature key generator 507 to the information issuing device 300c. When a key for signature of a viewing certificate is requested by the broadcast receiving device 100c, the signature key request receiver 502 performs processing for requesting the signature key transmitter 503 to transmit the key for signature. The broadcast receiving device 100c includes its ID in a command for requesting a key for signature of a viewing certificate and transmits the request command. In this case, the signature key request receiver 502 informs the broadcast receiving device manager 506 of the ID of the broadcast receiving device 100c to which the key for signature is transmitted. The broadcast receiving device manager 506 stores a key for signature delivered to a broadcast receiving device 100c and the ID of the broadcast receiving device as a pair. When a key for verification of a viewing certificate is requested by the information issuing device 300c, the verification key request receiver 504 performs processing for requesting the verification key transmitter 505 to transmit the key for verification.

Figure 17:
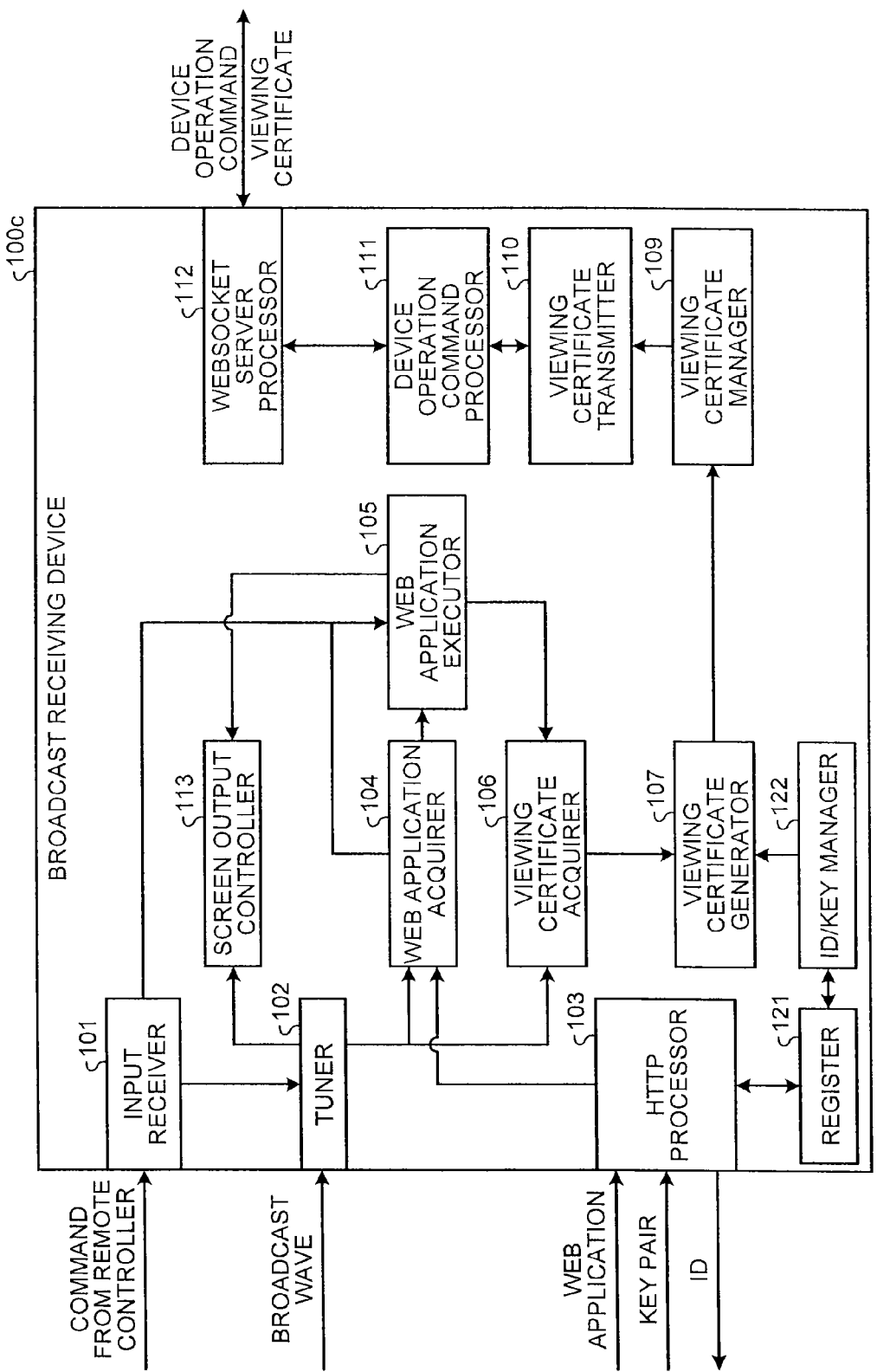
FIG. 17 is a block diagram illustrating an internal configuration of a broadcast receiving device according to the second embodiment.

FIG. 17 is a block diagram illustrating an internal configuration of the broadcast receiving device 100c according to the second embodiment. The difference from the broadcast receiving device 100 illustrated in FIG. 2 lies in that a register 121 and an ID/key manager 122 are provided instead of the key manager 108. The ID/key manager 122 is a processing unit configured to store an ID (DTV ID) unique to the broadcast receiving device 100c. The ID/key manager 122 also performs processing for receiving and storing a key for signature of a viewing certificate from the broadcast receiving device management server 500.

The register 121 performs processing for acquiring the ID unique to the broadcast receiving device 100c from the ID/key manager 122, transmitting the ID to the broadcast receiving device management server 500 to request a key for signature of a viewing certificate, and storing the key in the ID/key manager 122 upon receiving the key.

Figure 18:
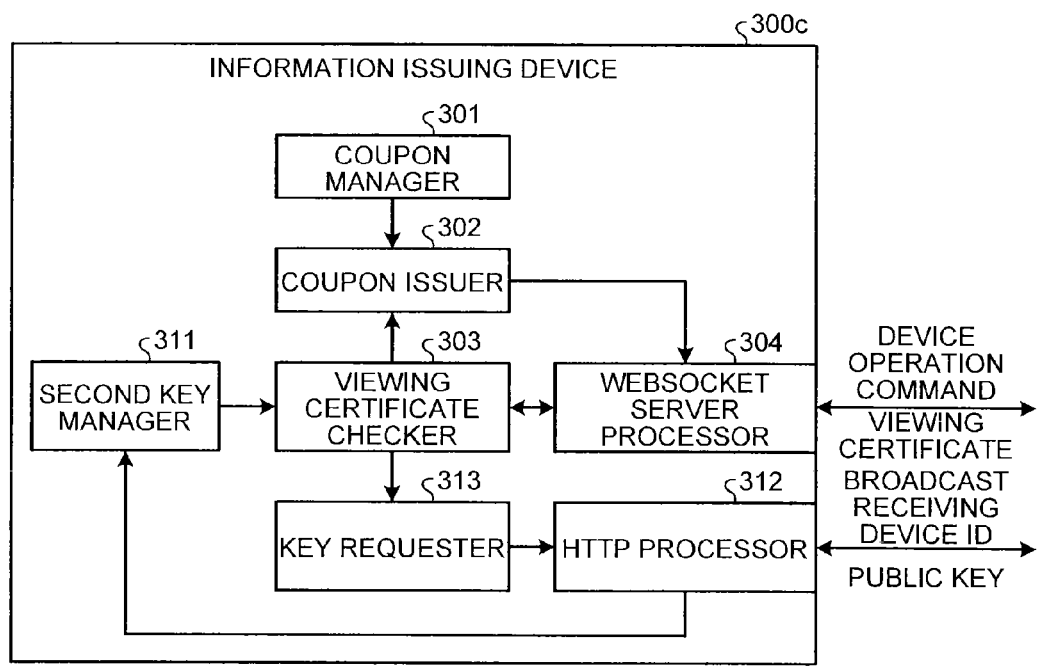
FIG. 18 is a block diagram illustrating an internal configuration of an information issuing device according to the second embodiment.

FIG. 18 is a block diagram illustrating an internal configuration of the information issuing device 300c according to the second embodiment. The difference from the information issuing device 300 illustrated in FIG. 4 lies in that a second key manager 311, an HTTP processor 312, and a key requester 313 are additionally provided. In the first embodiment, it is assumed that the information issuing device 300 holds in advance a key for verifying a signature added to a viewing certificate. If a public key system is used for the signature scheme and different keys (secret keys (signature keys)) are assigned to different broadcast receiving devices 100, it is difficult for the information issuing device 300 to hold a number of keys (public keys) corresponding to the number of the secret keys. Thus, in the second embodiment, the information issuing device 300c performs processing for inquiring of the broadcast receiving device management server 500 the public key required for verification and then acquiring the public key.

The key requester 313 performs processing for acquiring the ID (DTV ID) unique to the broadcast receiving device 100c contained in the viewing certificate received from the portable device 200, and requesting the broadcast receiving device management server 500 to transmit the key for verification by specifying the ID of the broadcast receiving device 100c.

The second key manager 311 performs processing for storing the key for verification received from the broadcast receiving device management server 500.

Figure 19:
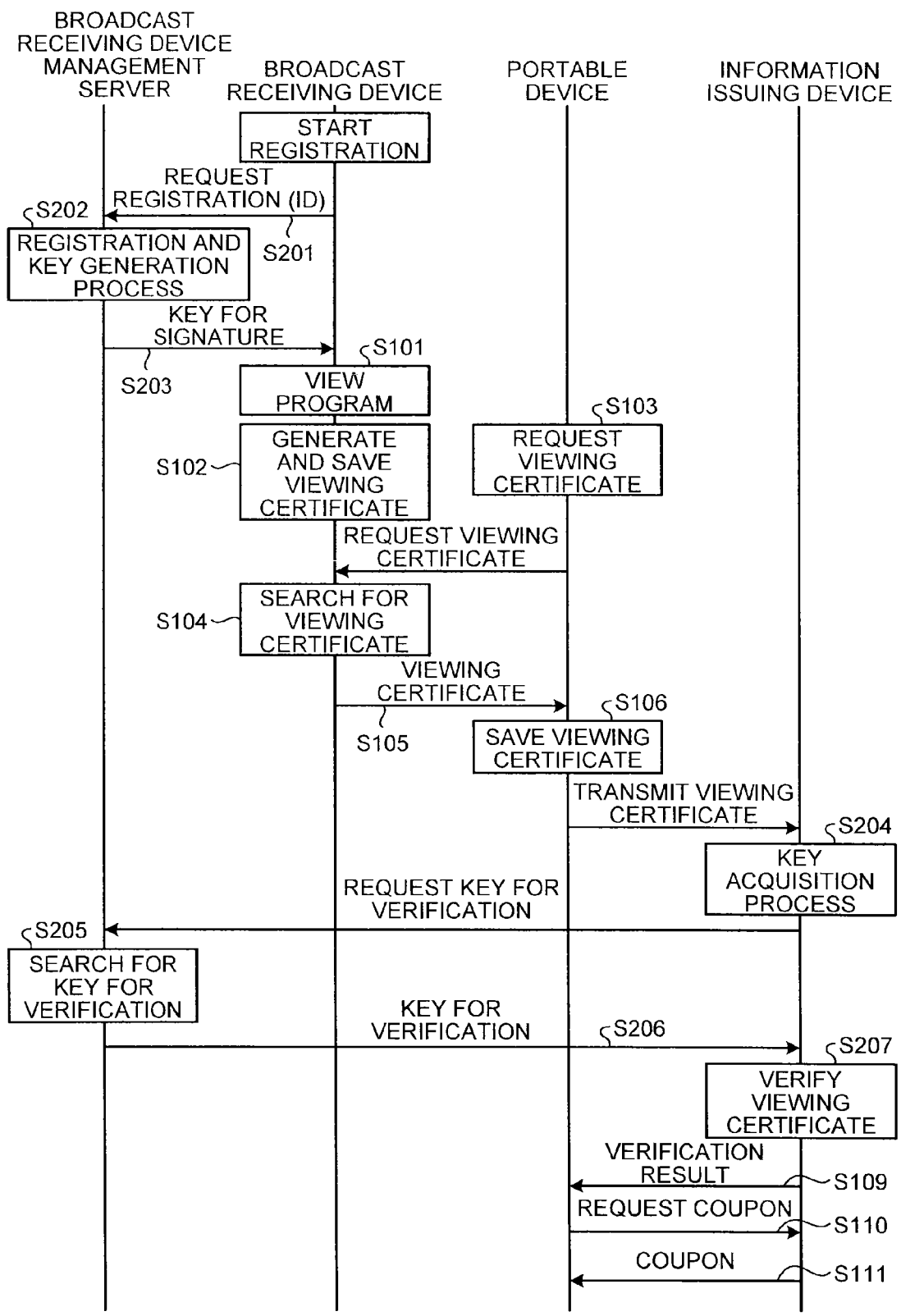
FIG. 19 is a flowchart illustrating a flow of processing according to the second embodiment.

FIG. 19 is a flowchart illustrating procedures performed by the broadcast receiving device 100c, the portable device 200, the information issuing device 300c, and the broadcast receiving device management server 500 according to the second embodiment. First, the register of the broadcast receiving device 100c acquires an ID unique to the broadcast receiving device 100c from the ID/key manager 122, and transmits a registration request to the broadcast receiving device management server 500 using the HTTP protocol (step S201).

The broadcast receiving device management server 500 generates a key (signature key) for signing a viewing certificate and a key (verification key) for verifying the viewing certificate, registers the generated keys together with the received ID unique to the broadcast receiving device 100c in the ID/key manager 122, and transmits the signature key to the broadcast receiving device 100c (steps S202 and S203). Although a process of generating a key on the basis of the registration request is described herein, the key may be generated in advance and then associated with the ID and stored in association with the ID upon receiving the registration request.

Hereinafter, the flow of processing from when a broadcast program is viewed on the broadcast receiving device 100c to step S106 in which a viewing certificate is transmitted from the portable device 200 to the information issuing device 300c is the same as the first embodiment illustrated in FIG. 5. When the information issuing device 300c has received a viewing certificate, the second key manager 311 acquires the ID unique to the broadcast receiving device 100c contained in the viewing certificate, and transmits the ID and a message requesting a key for verification to the broadcast receiving device management server 500 (step S204). The broadcast receiving device management server 500 searches for the key for verification from the broadcast receiving device manager 506 on the basis of the ID unique to the broadcast receiving device 100c (step S205), and transmits the key for verification to the information issuing device 300c (step S206). The information issuing device 300c stores the received key for verification into the second key manager 311. The viewing certificate checker 303 then verifies the signature attached to the viewing certificated by using the acquired key for verification (step S207). Subsequent processing is the same as that in the first embodiment illustrated in FIG. 5.

Figure 20:
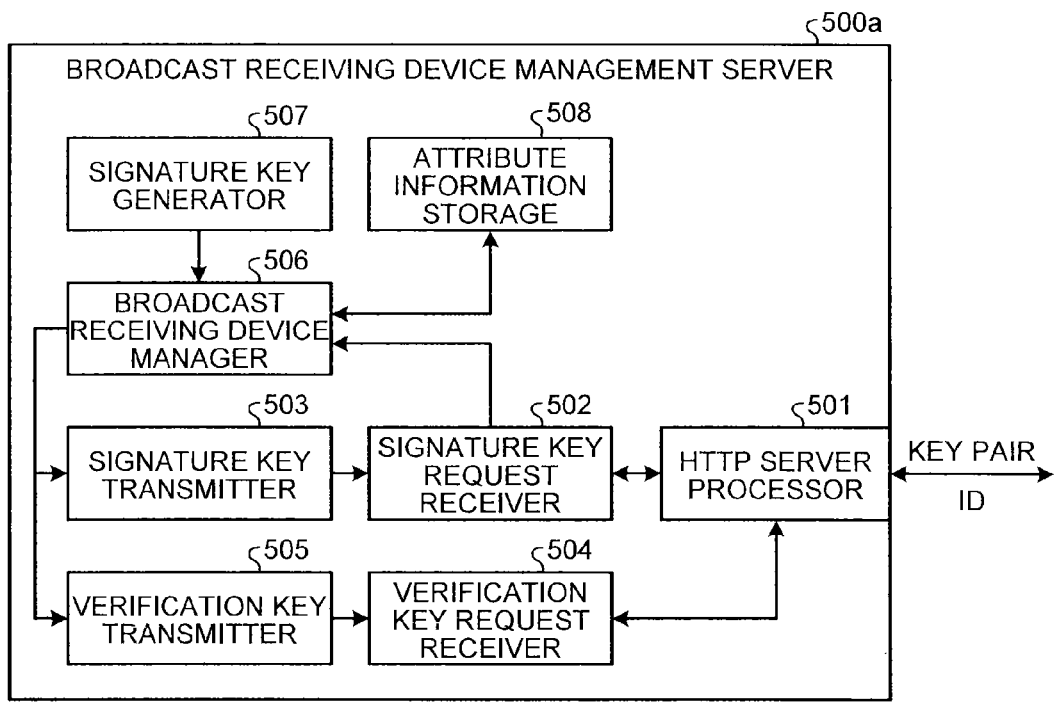
FIG. 20 is a block diagram of a broadcast receiving device management server according to a modified example of the second embodiment.

FIG. 20 illustrates another example of the broadcast receiving device management server 500. The difference between a broadcast receiving device management server 500a illustrated in FIG. 20 and the broadcast receiving device management server 500 illustrated in FIG. 16 lies in that an attribute information storage 508 is additionally provided. The attribute information storage 508 is a processing unit configured to store information related to the broadcast receiving device 100c. For example, the attribute information storage 508 is a processing unit configured to store the gender, the age, the preference or the like of the owner of the broadcast receiving device 100c in association with the ID of the broadcast receiving device 100c.

Figure 21:
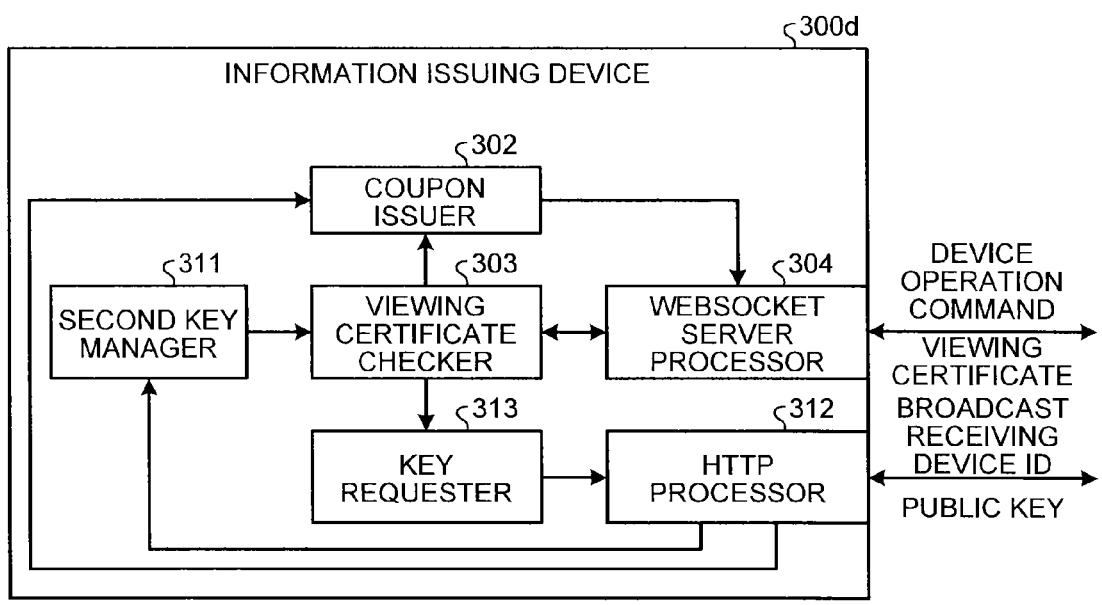
FIG. 21 is a block diagram illustrating an internal configuration of an information issuing device according to a modified example of the second embodiment.

FIG. 21 is a block diagram illustrating an internal configuration of the information issuing device 300d in association with FIG. 20. The difference from the information issuing device 300 illustrated in FIG. 18 lies in that a coupon issuer 302 is connected to an HTTP processor 312, and has a function of communicating with the broadcast receiving device management server 500.

Figure 22:
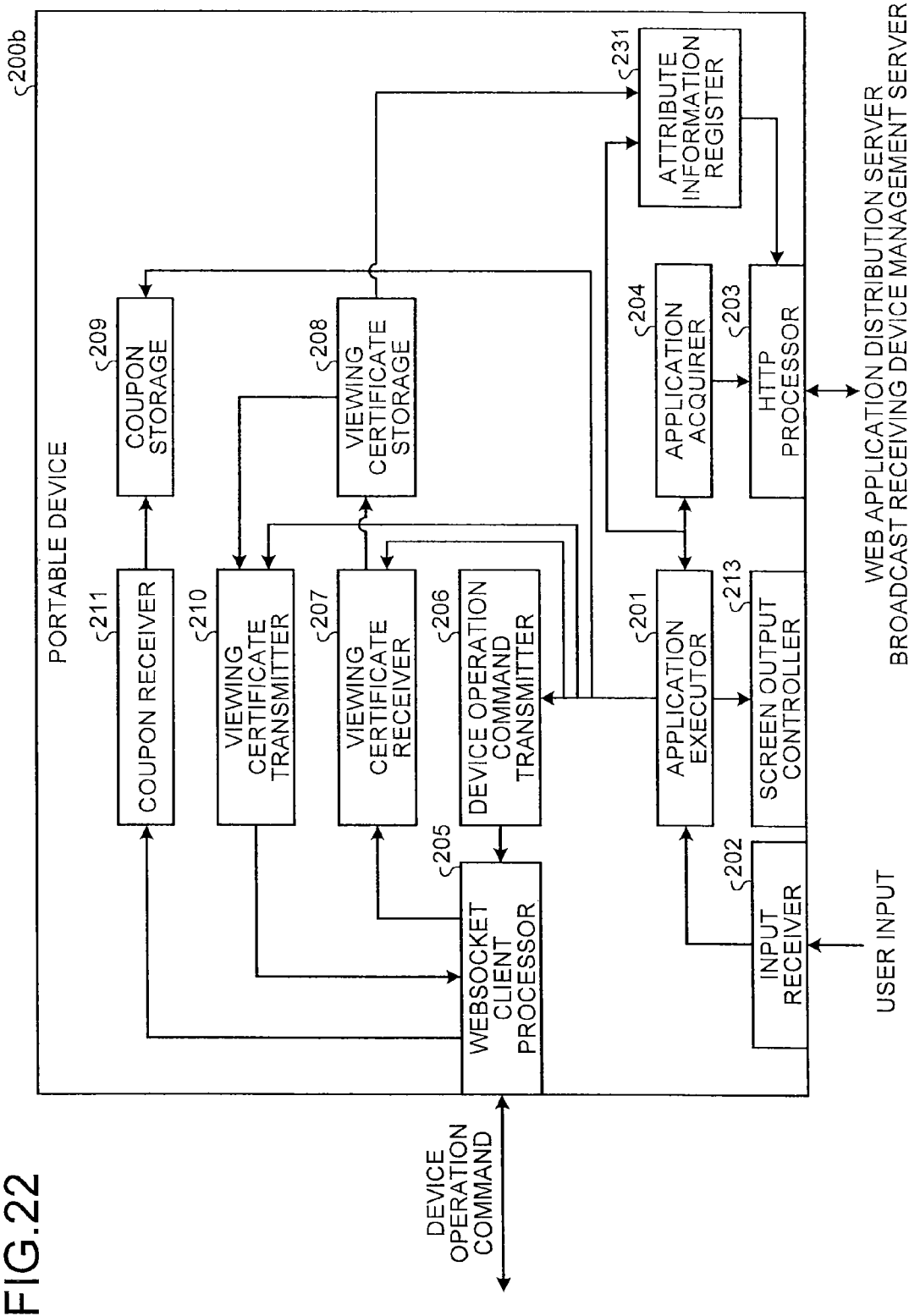
FIG. 22 is a block diagram illustrating an internal configuration of a portable device according to a modified example of the second embodiment.

FIG. 22 is a block diagram illustrating an internal configuration of portable device 200b in association with FIG. 20. The difference from the portable device 200 illustrated in FIG. 3 lies in that an attribute information register 231 is additionally provided. The attribute information register 231 is a processing unit configured to register attribute information related to the ID of the broadcast receiving device 100c into the broadcast receiving device 100c. A viewing certificate contains the unique ID of the broadcast receiving device 100c. The attribute information register 231 acquires the ID from the viewing certificate storage 208. The attribute information register 231 further performs processing for transmitting information such as the gender, the age, and the preference acquired by the input receiver 202 to the broadcast receiving device management server 500.

Figure 23:
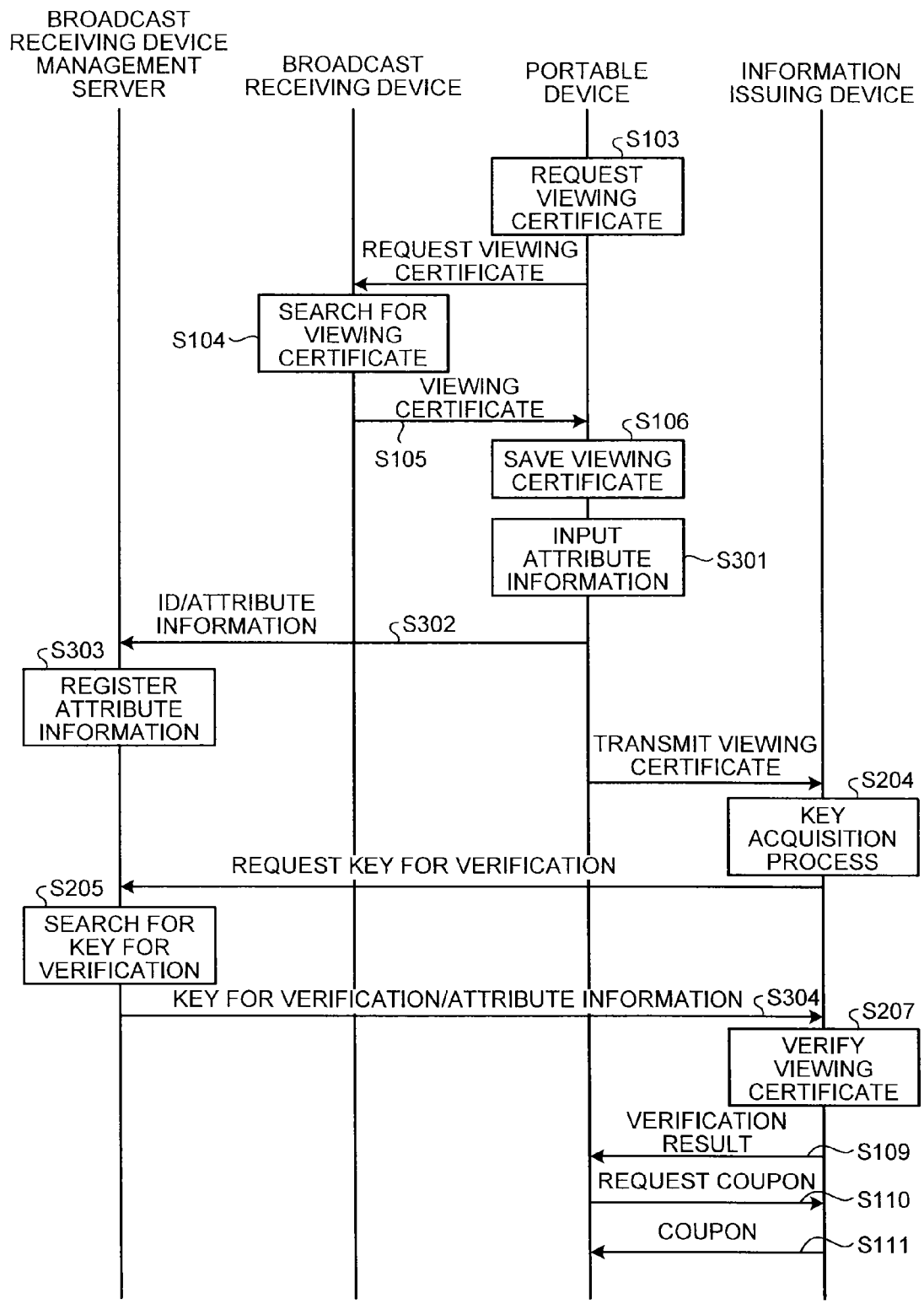
FIG. 23 is a flowchart illustrating a flow of processing according to a modified example of the second embodiment.

FIG. 23 is a flowchart illustrating procedures performed by the broadcast receiving device 100c, the portable device 200b, the information issuing device 300d, and the broadcast receiving device management server 500a with the configurations of FIGS. 20 to 22. The processing up to step S106 in which the portable device 200b stores the viewing certificate may be the same as that in FIG. 19. Subsequently, the portable device 200b inputs attribute information related to the ID of the broadcast receiving device 100c based on the viewing certificate (step S301), and transmits the attribute information together with the ID of the broadcast receiving device 100c to the broadcast receiving device management server 500a (step S302).

The broadcast receiving device management server 500a registers the received attribute information into the attribute information storage 508 (step S303). Subsequent processing up to search for the key for verification by the broadcast receiving device management server 500 may be the same as that up to step S205 in FIG. 19. The broadcast receiving device management server 500a acquires the attribute information associated with the verification key in addition to the verification key from the attribute information storage 508, and transmits the verification key and the attribute information to the information issuing device 300d (step S304).

In the present embodiment described above, the information issuing device 300d can issue a coupon suitable for the owner of the broadcast receiving device 100c. If the gender, the age, the family members and the like are also registered when the broadcast receiving device 100c is registered in the broadcast receiving device management server 500, the information issuing device 300d can specify the user owning the broadcast receiving device 100c when issuing a coupon. If multiple different coupons associated with the attribute information are prepared, different coupons can be issued to users having viewed the same program in such a manner as a coupon for a male living alone, a coupon for a family of three, etc.

Third Embodiment

In the first and second embodiment, any portable device 200 can acquire a viewing certificate. In the third embodiment, portable devices 200 that are permitted to acquire viewing certificates are limited so that unnecessary leakage of viewing certificates from a broadcast reception server can be prevented.

Figure 24:
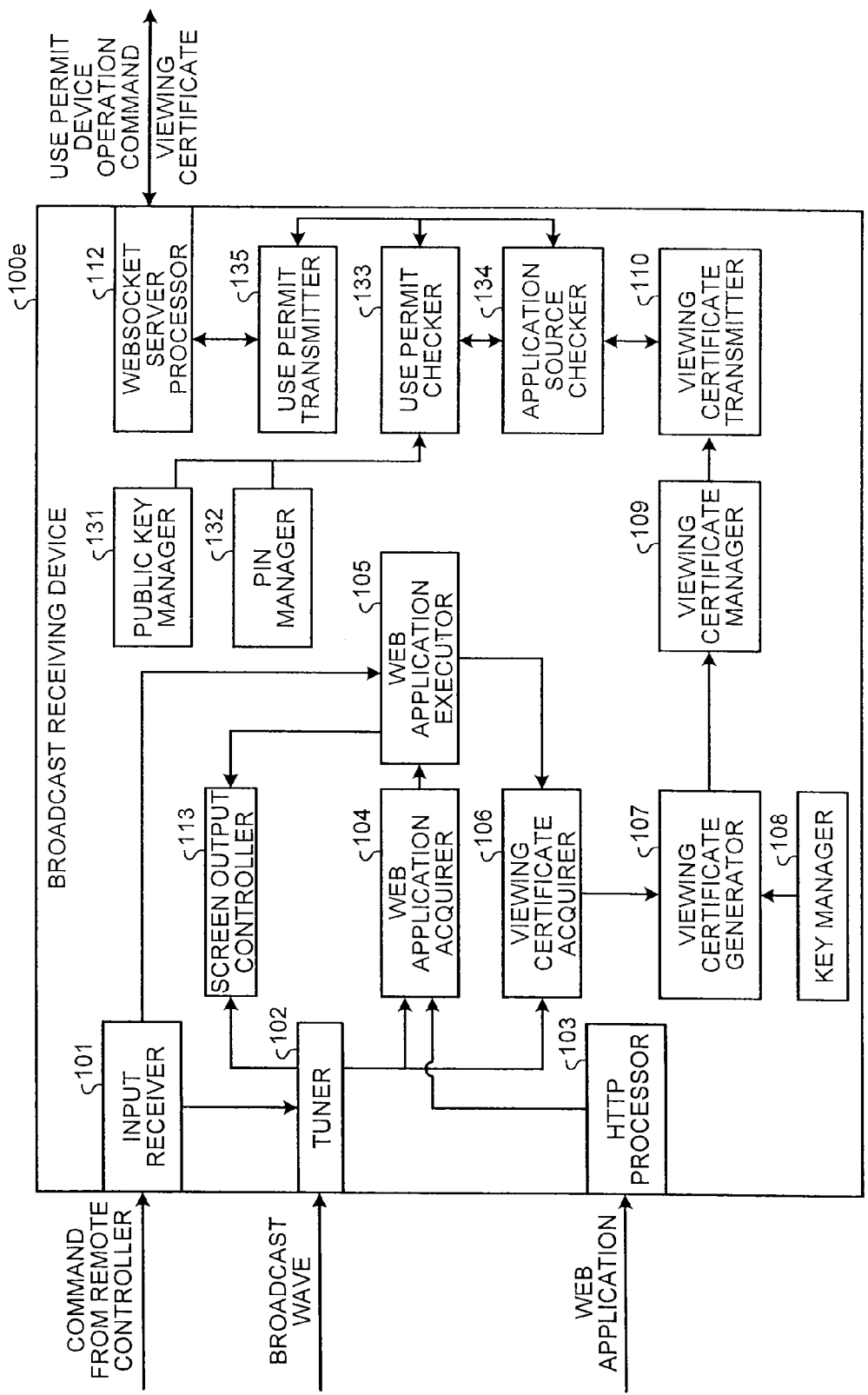
FIG. 24 is a block diagram illustrating an internal configuration of a broadcast receiving device according to a third embodiment.

FIG. 24 is a block diagram illustrating an internal configuration of a broadcast receiving device 100e according to the third embodiment. The difference from the broadcast receiving device 100 illustrated in FIG. 2 lies in that a public key manager 131, a PIN manager 132, a use permit checker 133 (first determiner), a use permit transmitter 135, and an application source checker 134 (second determiner) are additionally provided.

The public key manager 131 is a processing unit configured to store a public key for verifying a use permit, which will be described later. The PIN manager 132 is a processing unit configured to store a password. The use permit checker 133 is a processing unit configured to check whether a use permit, which will be described later, is valid. The application source checker 134 is a processing unit configured to check whether a web application running on a portable device 200 is one which is downloaded from an authorized web application distribution server 400 on the basis of source information. The use permit transmitter 135 transmits a use permit to the portable device 200e.

Figure 25:
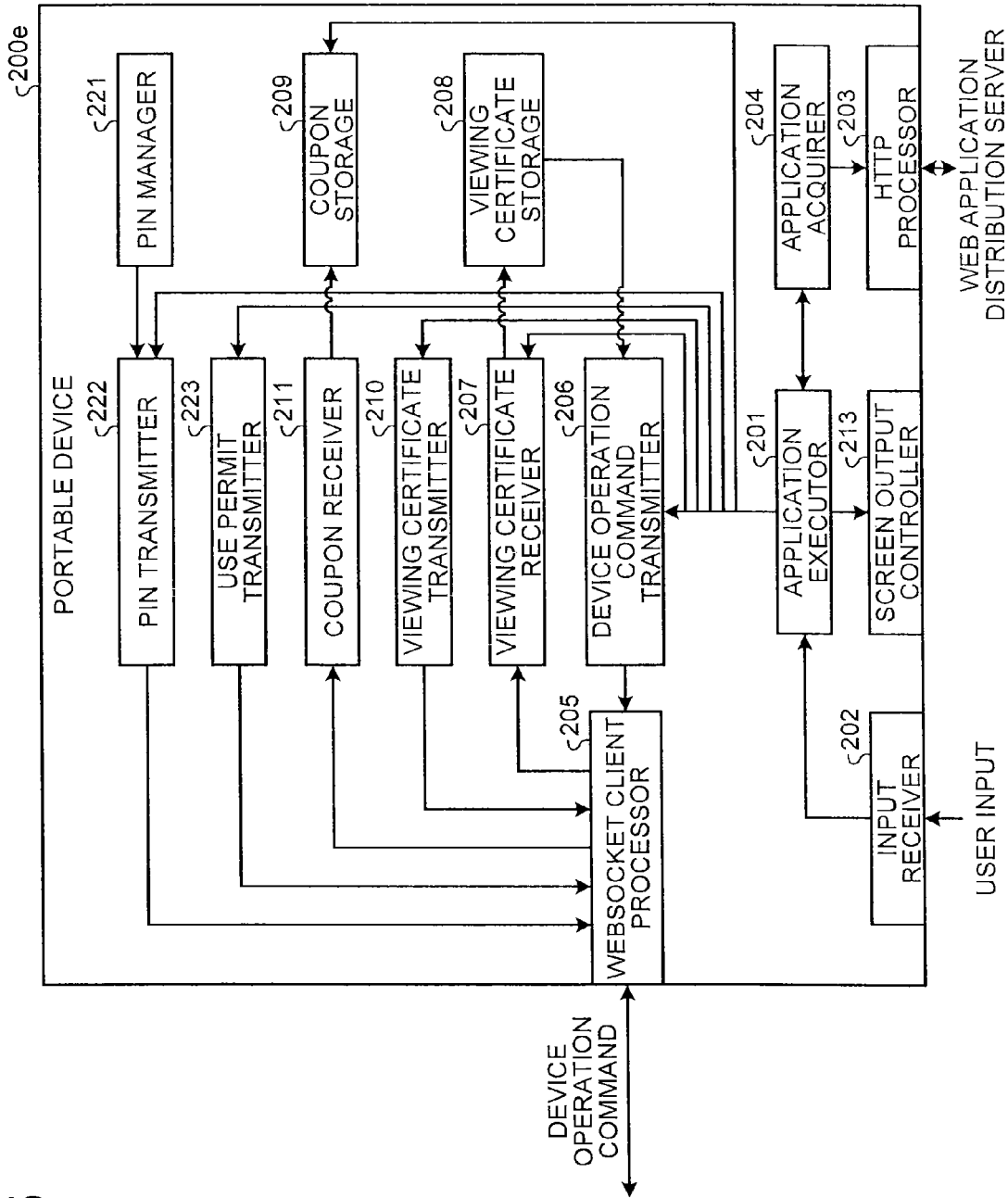
FIG. 25 is a block diagram illustrating an internal configuration of a portable device according to the third embodiment.

FIG. 25 is a block diagram illustrating an internal configuration of the portable device 200e according to the third embodiment. The difference from the portable device 200 illustrated in FIG. 3 lies in that a PIN manager 221, a PIN transmitter 222, and a use permit transmitter 223 are additionally provided. The PIN manager 221 is a processing unit configured to store a password (PIN). The password is a value input by a user input unit using a web application executed by the application executor 201 and stored in the PIN manager 221. The PIN transmitter 222 is a processing unit configured to transmit a PIN stored in the PIN manager 221 to the broadcast receiving device 100e. The use permit transmitter 223 performs processing for transmitting a use permit held by a web application executed by the application executor 201 to the broadcast receiving device 100e.

FIG. 26 is a diagram illustrating an example of a format of a use permit. A use permit includes a web application source (domain name) and a signature that are essential fields. The web application source is a domain name of a transmission source web server of a web application that transmits a command requesting a use permit or a viewing certificate to the broadcast receiving device 100e. The signature is a value of a signature calculated according to the public key cryptography using a secret key for a hash value of the web application source. For the hash algorithm, a well-known scheme such as MD5 or SHA1 may be used. For the signature algorithm, a well-known scheme such as an RSA cryptography or an elliptic curve cryptography may be used. An example of calculation of the signature may be: signature=rsa (second secret key, SHA1 (web application domain name)).

Note that a second secret key is a value assigned to the developer of a web application. A public key associated with the second secret key is stored in the public key manager 131 of the broadcast receiving device 100e. Thus, only the developer having the second secret key associated with a public key stored in the public key manager 131 of the broadcast receiving device 100e can generate a validated signature.

Figure 27:
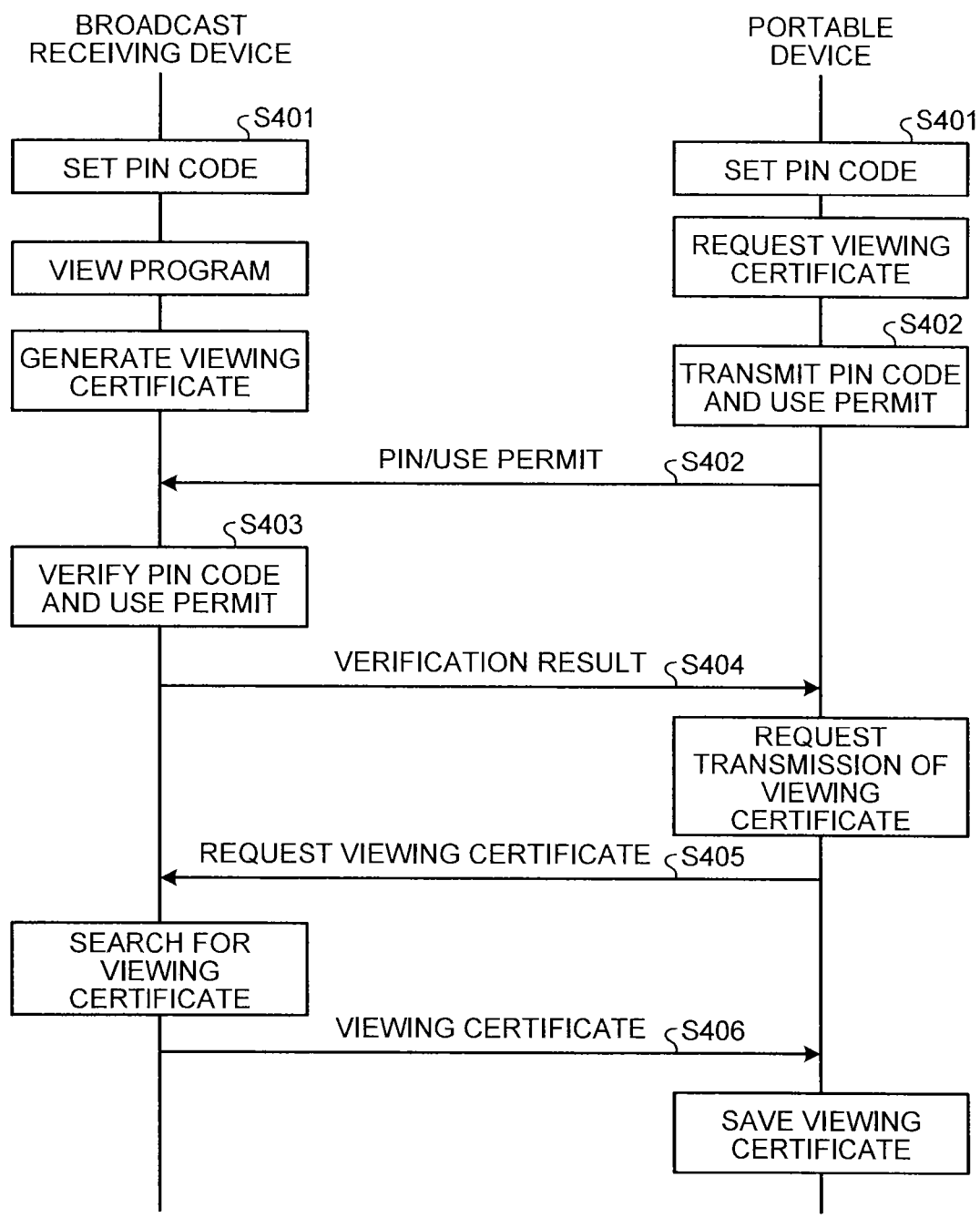
FIG. 27 is a flowchart illustrating procedures according to the third embodiment.

FIG. 27 is a flowchart illustrating procedures performed by the broadcast receiving device 100e and the portable device 200e according to the third embodiment. First, before communication between the portable device 200e and the broadcast receiving device 100e, a password is input and set at each of the devices (step S401). This process is a process for storing a value received by the input receiver 101 into the PIN manager 132.

Subsequently, a web application running on the application executor 201 uses the PIN transmitter 222 to transmit the PIN and uses the WebSocket client processor 205 to transmit a use permit that is a resource file held by the web application to the broadcast receiving device 100e (step S402).

In this process, the WebSocket client processor 205 performs processing for assigning a domain name (source information) of the web application running on the application executor 201 to a WebSocket header (a header of the WebSocket connection).

Subsequently, the broadcast receiving device 100e verifies the PIN code and the use permit received by the WebSocket server processor 112 (use permit receiver, header receiver) (step S403). Specifically, (a) it is determined whether the value of the PIN received from the portable device 200e matches the value stored in the PIN manager 132, and it is determined to be successful if the values match and it is determined to be unsuccessful if the values do not match. (b) The use permit checker 133 uses the public key stored by the public key manager 131 to determine whether the verification of the signature attached to the use permit is successful. (c) Furthermore, the application source checker 134 checks whether the web application source contained in the use permit and the web application domain name attached to the WebSocket header match with each other or one is included in the other, and it is determined to be successful if the source and the domain name match or one is included in the other or to be unsuccessful if the source and the domain do not match and neither is included in the other. If any one of the determinations (a) to (c) is unsuccessful, the verification is determined to be unsuccessful. In other words, the verification is determined to be successful if all of (a) to (c) are successful. The broadcast receiving device 100e transmits the determination result to the portable device 200e (step S404).

If the determination result is successful, the portable device 200e transmits a request for transmitting a viewing certificate to the broadcast receiving device 100e (step S405). The broadcast receiving device 100e searches for the viewing certificate and transmits the viewing certificate to the portable device 200e (step S406) only when the determination result is successful. If the determination result is unsuccessful, the viewing certificate will not be transmitted.

Transmission of a command requesting to transmit a viewing certificate to the broadcast receiving device 100e and reception of the viewing certificate from the broadcast receiving device 100e are performed by the application executor 201 (a web application running on the application executor 201) in the portable device 200e. Thus, if the web application running on the application executor 201 is a malicious web application, there is a risk that a viewing certificate may be used for a purpose different from the intended use. Since viewing certificates are history of programs viewed by users, these can be regarded as privacy information. An unauthorized web application may attempt to leak the privacy information.

When the broadcast receiving device 100e transmits a viewing certificate to the portable device 200e, the source of the application running on the application executor 201 of the portable device 200e can be checked. Furthermore, determination is made on the source information as to whether or not the source information matches with the use permit. Since a signature is assigned to the use permit by using the second secret key that is held only by the legitimate application developer, the use permit cannot be counterfeit.

With the configurations of the present embodiment described above, it is possible to allow the broadcast receiving device 100e to transmit a viewing certificate only when a web application running on the application executor 201 of the portable device 200e is legitimate, which can prevent leakage of privacy information.

Figure 28:
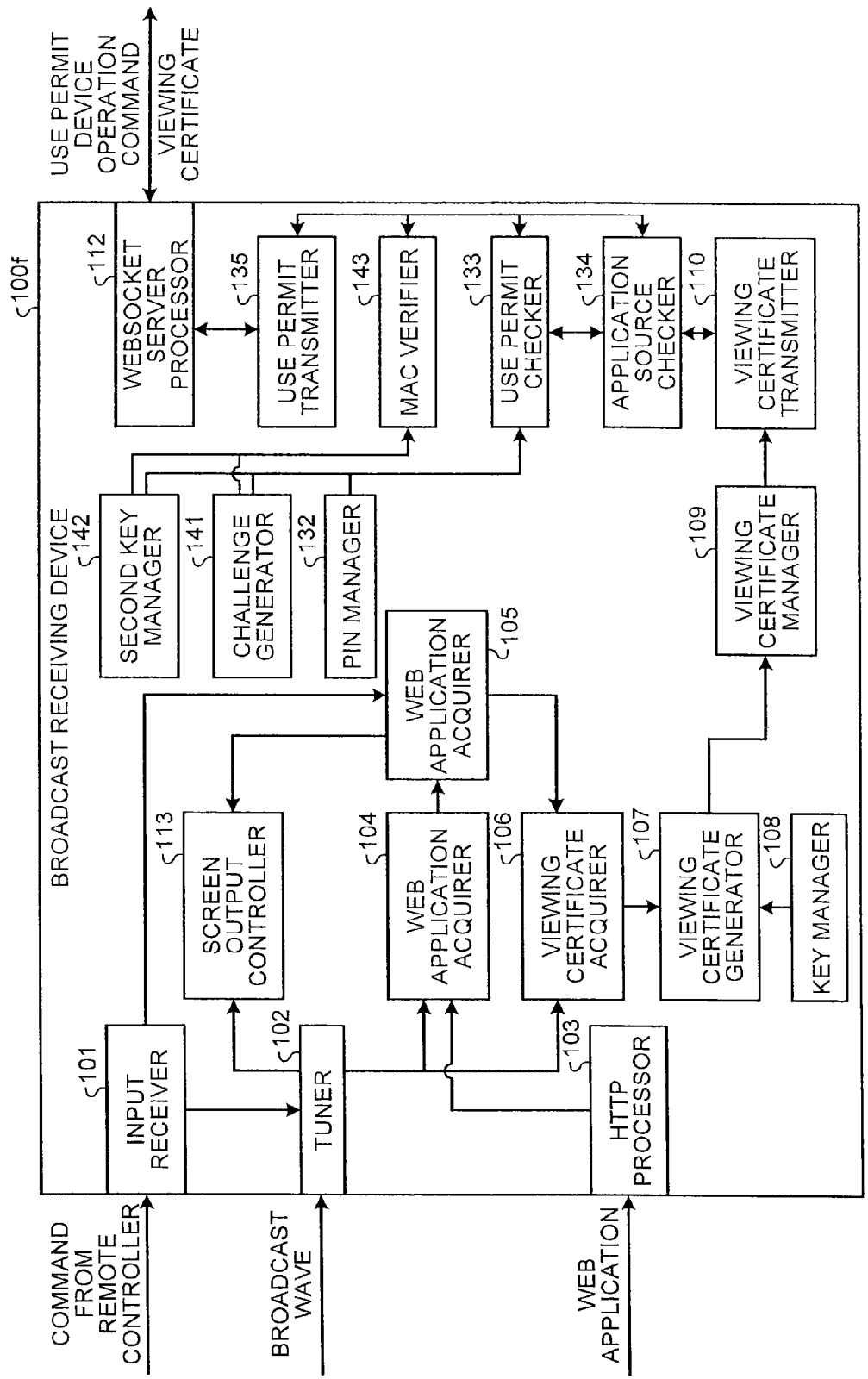
FIG. 28 is a block diagram illustrating an internal configuration of a broadcast receiving device according to a modified example of the third embodiment.

FIG. 28 illustrates another example of the broadcast receiving device 100e. The differences between a broadcast receiving device 100f illustrated in FIG. 28 and the broadcast receiving device 100e illustrated in FIG. 24 lie in that a challenge generator 141 is additionally provided, that a second key manager 142 is provided instead of the public key manager 131, and that a MAC verifier 143 is provided.

The challenge generator 141 performs processing for generating a random number and temporarily saving the random number. When a use permit is transmitted from a portable device 200f, the challenge generator 141 is used to generate a random number and transmit the random number to the portable device 200f. The second key manager 142 is a processing unit configured to store a public key for verifying a use permit and a third secret key for verifying a MAC, which will be described later. The MAC verifier 143 is a processing unit configured to generate a MAC value from the random number generated by the challenge generator 141, the third secret key used for verifying a MAC stored by the second key manager 142, and a password (PIN) stored by the PIN manager 132, and check whether the generated MAC value and a MAC value received from the portable device 200f match with each other. If the MAC values match with each other, the check is determined to be successful, and if the MAC values do not match, the check is determined to be unsuccessful. The method for calculating the MAC value will be described later.

Figure 29:
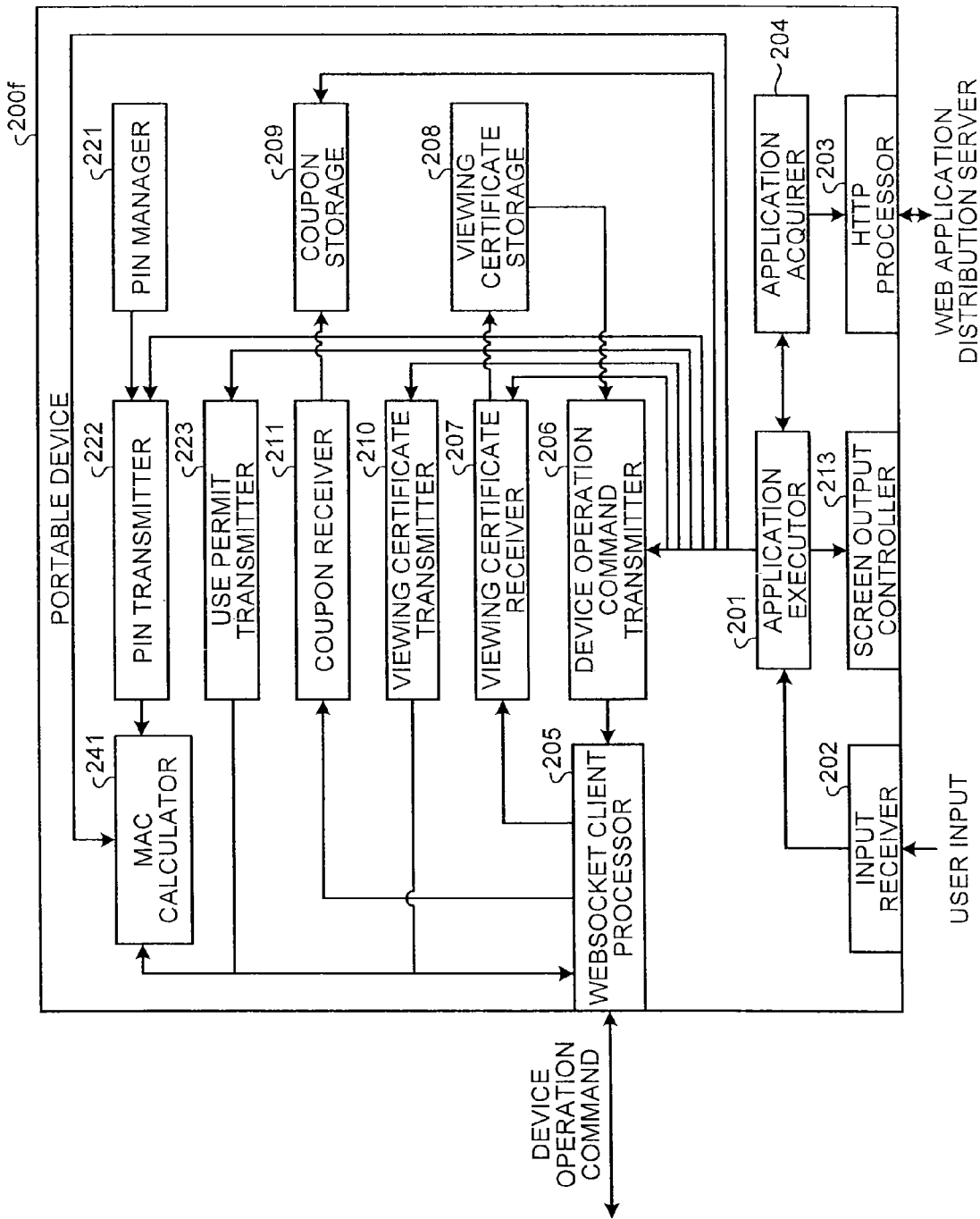
FIG. 29 is a block diagram illustrating an internal configuration of a portable device according to a modified example of the third embodiment.

FIG. 29 illustrates another example of the portable device 200e. The difference between the portable device 200f illustrated in FIG. 29 and the portable device 200e illustrated in FIG. 25 lies in that a MAC calculator 241 is additionally provided. The MAC calculator 241 manages the third secret key for MAC calculation. The MAC calculator 241 also generates a message authentication code by using the random number received from the broadcast receiving device 100*f* and the third key for MAC calculation. An example of the method for calculating the message authentication code generated by the portable device 200*f* may be: the MAC value=HMAC-SHA1 (MAC key, PIN‖challenge).

Note that the MAC key refers to the third secret key for MAC calculation managed by the MAC calculator 241, PIN refers to a password (PIN) managed by the PIN manager 221, and challenge refers to the random number received from the broadcast receiving device 100*f*. In response to the random number transmitted from the broadcast receiving device 100*f*, the web application running on the application executor 201 calculates the MAC value and returns the MAC value to the broadcast receiving device 100*f*.

FIG. 30 is a flowchart illustrating procedures performed by the broadcast receiving device 100*f* and the portable device 200*f*. The processing up to step S401 in which the portable device 200*f* transmits the use permit is the same as that in the flow illustrated in FIG. 27. The portable device 200*f* transmits only the use permit to the broadcast receiving device 100*f* without transmitting the PIN (step S501). Subsequently, the broadcast receiving device 100*f* verifies the authenticity of the use permit (step S502). In this process, since no PIN is transmitted from the portable device 200*f* to the broadcast receiving device 100*f*, the aforementioned determination (a) is not made and the verification is determined to be successful if both of the determinations (b) and (c) are successful.

The broadcast receiving device 100*f* verifies the signature of the received use permit. If the verification of the signature is successful, the following processing will be performed. If the verification is unsuccessful, error processing will be performed instead of the following processing. The error processing is processing such as informing the user that the verification is unsuccessful. The broadcast receiving device 100*f* generates a random number by the challenge generator 141 (step S503), and transmits the random number to the portable device 200*f* (step S504). The portable device 200*f* calculates the MAC value according to the aforementioned expression (step S505), and transmits the MAC value to the broadcast receiving device 100*f* (step S506).

The broadcast receiving device 100*f* calculates the MAC value similarly to the aforementioned expression for calculating the MAC value by the portable device 200*f* by using the third secret key used for verification of the MAC managed by the second key manager 142, the random number generated by the challenge generator 141, and the password (PIN) managed by the PIN manager 132. The broadcast receiving device 100*f* then verifies whether the MAC value transmitted from the portable device 200*f* and the MAC value calculated therein match with each other (step S507), and transmits a viewing certificate to the portable device 200*f* only if the MAC values match with each other (step S508).

With the configurations in the present embodiment described above, since no PIN is transmitted from the portable device 200*f* to the broadcast receiving device 100*f*, the PIN value is not leaked over the network. Furthermore, since the terminals that can calculate proper MAC values are limited to those having authentic MAC keys, the broadcast receiving device 100*f* can reject requests for viewing certificates from unauthorized portable terminals.

Each unit of the broadcast receiving device 100, the portable device 200, and the information issuing device 300 may be implemented by executing a computer program by a processing device such as a central processing unit (CPU); that is, implemented by using software, implemented by using hardware such as an integrated circuit (IC), or implemented by using software and hardware in combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A broadcast receiving device comprising:
a tuner configured to receive broadcast waves containing information identifying a broadcast program, and a viewing certificate certifying that a specific broadcast program has been received;
an acquirer circuit configured to acquire the viewing certificate from the broadcast waves received by the tuner;
a signature executor circuit configured to sign the acquired viewing certificate by using a key;
a first interface connected to an external device via a network;
a command receiver configured to receive a command for acquiring the viewing certificate from the external device;
a transmitter configured to transmit the viewing certificate that is signed to the external device that has issued the acquisition command;
a permit receiver configured to receive, from the external device, a use permit containing source information of an application executed by the external device; and
a second determiner circuit configured to compare the source information received from the external device with source information contained in the use permit.

2. The device according to claim 1, further comprising:
a second interface configured to connect to a management server to manage the key by using a protocol different from that for the external device;
a key receiver configured to receive the key from the management server by using the second interface; and
a key storage configured to store the key received by the key receiver, wherein
the signature executor circuit is configured to sign the viewing certificate by using the key stored in the key storage.

3. The device according to claim 1, wherein the first interface is configured to communicate using a WebSocket protocol.

4. The device according to claim 2, wherein:
the first interface is configured to communicate using a WebSocket protocol, and
the second interface is configured to communicate using a Hypertext Transfer Protocol (HTTP).

5. The device according to claim 1, further comprising:
the permit receiver is further configured to receive a signature of the use permit;
a key manager circuit configured to store a public key associated with a key used for the signature;

a first determiner circuit configured to verify whether or not the signature contained in the received use permit is validated by using the public key stored in the key manager circuit;

a header receiver configured to receive, from the external device, data containing header information provided with the source information of the application executed by the external device; and the second determiner circuit is further configured to determine whether or not the source information contained in the header information of the received data matches with the source information contained in the use permit, and whether or not the source information contained in the header information includes the source information contained in the use permit, wherein when the determinations performed by the first determiner circuit and the second determiner circuit are positive, the transmitter is configured to transmit the viewing certificate to the external device.

6. The device according to claim 1, comprising:

the permit receiver is further configured to receive a signature of the use permit;

a key manager circuit configured to store a public key associated with a key used for the signature;

a first determiner circuit configured to verify whether or not the signature contained in the received use permit is validated by using the public key stored in the key manager circuit;

a header receiver configured to receive, from the external device, data containing header information provided with the source information of the application executed by the external device; and the second determiner circuit is further configured to determine whether or not the source information contained in the use permit includes the source information contained in the header information, wherein when the determinations performed by the first determiner circuit and the second determiner circuit are positive, the transmitter is configured to transmit the viewing certificate to the external device.

7. The device according to claim 5, further comprising:

a manager circuit configured to manage a password unique to a device; and a third determiner circuit configured to determine whether or not a password transmitted from the external device matches with the password managed by the manager circuit, wherein the transmitter is configured to transmit the viewing certificate to the external device when the third determiner circuit determines that the passwords match with each other.

8. The device according to claim 7, further comprising:

a challenge generator configured to generate a random number and transmit the generated random number to the external device;

a second manager circuit configured to store secret keys used for generation and verification of a Message Authentication Code (MAC) value; and a MAC verifier circuit configured to receive a MAC value from the external device, generate a MAC value from the password, the random number, and the secret key, and verify whether or not the generated MAC value matches with the received MAC value.

9. The device according to claim 1, wherein the viewing certificate contains information indicating whether the program is a live program or a recorded program.

10. The device according to claim 1, wherein the viewing certificate contains identification information of the external device.

11. An information processing system comprising:

a broadcast receiving device configured to receive broadcast waves;

an external device configured to manage information indicating that a broadcast program contained in the broadcast waves has been viewed on the broadcast receiving device; and an information issuing device configured to transmit specific information to the external device, wherein the broadcast receiving device includes:

a tuner configured to receive information identifying a broadcast program, and a viewing certificate certifying that a specific broadcast program has been received from broadcast waves;

an acquirer circuit configured to acquire the viewing certificate received by the tuner;

a signature executor circuit configured to sign the acquired viewing certificate by using a key;

a network interface connected to an external device via a network;

a command receiver configured to receive a command to acquire the viewing certificate from the external device;

a transmitter configured to transmit the viewing certificate to which the signature is applied to the external device that has issued the acquisition command;

a permit receiver configured to receive, from the external device, a use permit containing source information of an application executed by the external device; and a second determiner circuit configured to compare the source information received from the external device with source information contained in the use permit the external device includes:

a command transmitter configured to request the broadcast receiving device to transmit the viewing certificate;

a viewing certificate receiver configured to receive the viewing certificate;

a viewing certificate storage configured to store the received viewing certificate; and a viewing certificate transmitter configured to transmit the stored viewing certificate to the information issuing device, and the information issuing device includes:

a public key manager circuit configured to manage a public key for verifying a signature of a viewing certificate;

a viewing certificate checker circuit configured to verify whether the signature applied to the viewing certificate received from the external device is valid by using the public key;

a coupon manager circuit configured to manage a predetermined coupon to be issued; and a coupon issuer circuit configured to issue the coupon from, the coupon manager when the viewing certificate is determined to be valid by the viewing certificate checker.

12. The system according to claim 11, further comprising a management server that includes:

a signature key transmitter configured to transmit a key for signature of the viewing certificate to the broadcast receiving device; and a verification key transmitter configured to transmit, to the information issuing device, the public key to be used by the viewing certificate checker circuit.

13. The system according to claim 12, wherein the management server further includes an attribute information storage configured to store attribute information of an owner of the broadcast receiving device in association with the broadcast receiving device, the verification key transmitter is configured to transmit the corresponding attribute information in addition to the public key to the information issuing device, and the coupon issuer circuit is configured to change the coupon to be issued on the basis of the received attribute information.

14. The system according to claim 11, wherein the broadcast receiving device further comprises:

the permit receiver is further configured to receive a signature of the use permit;

a key manager circuit configured to store a public key associated with a key used for the signature;

a first determiner circuit configured to verify whether or not the signature contained in the received use permit is validated by using the public key stored in the key manager circuit;

a header receiver configured to receive, from the external device, data containing header information provided with the source information of the application executed by the external device; and the second determiner circuit is further configured to determine whether or not the source information contained in the header information of the received data matches with the source information contained in the use permit, and whether or not the source information contained in the header information includes the source information contained in the use permit, wherein when the determinations performed by the first determiner circuit and the second determiner circuit are positive, the transmitter is configured to transmit the viewing certificate to the external device.

15. The system according to claim 12, wherein the management server is further configured to:

store an identification of the broadcast receiving device and a key for signature delivered to the broadcast receiving device as a pair.

\* \* \* \* \*